United States Patent [19]

Weigold et al.

[11] Patent Number: 5,397,552
[45] Date of Patent: * Mar. 14, 1995

[54] METHOD AND APPARATUS FOR USE IN PHOTOCHEMICALLY OXIDIZING GASEOUS ORGANIC COMPOUNDS

[75] Inventors: Theodore S. Weigold, Boise, Id.; Stephen J. Galayda, Wilmington, Del.; Orville B. Guyer, West Bend, Wis.

[73] Assignee: Process Technologies, Inc., Boise, Id.

[*] Notice: The portion of the term of this patent subsequent to Nov. 9, 2010 has been disclaimed.

[21] Appl. No.: 78,901
[22] Filed: Jun. 15, 1993

Related U.S. Application

[63] Continuation-in-part of Ser. No. 843,422, Feb. 27, 1992, Pat. No. 5,260,026.

[51] Int. Cl.$^6$ ............................................. C02F 1/32
[52] U.S. Cl. .................................. 422/186.3; 422/24; 422/168
[58] Field of Search .................. 422/186.3, 168, 24

[56] References Cited

U.S. PATENT DOCUMENTS

| | | | |
|---|---|---|---|
| 2,998,308 | 8/1961 | Ruth. | |
| 3,674,666 | 7/1972 | Foster et al. | 204/164 |
| 3,773,044 | 1/1973 | Wallace | 128/142.6 |
| 3,902,485 | 9/1975 | Wallace | 128/142.6 |
| 3,977,952 | 4/1976 | Knoevenagel et al. | 204/157.1 R |
| 4,045,316 | 8/1977 | Legan | 204/158 R |
| 4,129,418 | 1/1978 | Davis | 422/98 |
| 4,144,152 | 3/1979 | Kitchens | 204/158 R |
| 4,146,887 | 3/1979 | Magnante | 340/632 |
| 4,210,503 | 7/1980 | Confer | 204/158 R |
| 4,399,686 | 8/1983 | Kindlund et al. | 73/23 |
| 4,454,099 | 6/1984 | Moffat | 423/210 |
| 4,468,376 | 8/1984 | Suggitt | 423/358 |
| 4,499,054 | 2/1985 | Katsura et al. | 422/98 |
| 4,668,489 | 3/1987 | Alexander et al. | 423/240 |
| 4,694,179 | 9/1987 | Lew et al. | 250/431 |
| 4,780,287 | 10/1988 | Zeff et al. | 422/186.3 |
| 4,786,484 | 1/1988 | Nelson | 423/239 |
| 4,847,594 | 7/1989 | Stetter | 340/540 |
| 4,892,712 | 1/1990 | Robertson et al. | 422/186 |
| 4,935,212 | 6/1990 | Jacob | 423/240 |
| 4,937,065 | 6/1990 | Maurer et al. | 423/659 |
| 4,941,957 | 7/1990 | Zeff et al. | 204/157.3 |
| 4,954,320 | 9/1990 | Birmingham et al. | 422/186 |
| 4,966,665 | 10/1990 | Ibusuki et al. | 204/157.3 |
| 4,971,687 | 11/1990 | Anderson | 210/85 |
| 4,983,366 | 1/1991 | Deller et al. | 423/240 |
| 4,990,311 | 2/1991 | Hirai et al. | 422/4 |
| 5,032,241 | 7/1991 | Robertson et al. | 204/157.15 |
| 5,035,784 | 7/1991 | Anderson et al. | 204/158.14 |
| 5,045,288 | 9/1991 | Raupp et al. | 422/186.3 |
| 5,055,266 | 10/1991 | Stetter et al. | 422/83 |
| 5,069,885 | 1/1991 | Ritchie | 422/186 |
| 5,126,111 | 6/1992 | Al-Ekabi et al. | 422/186.3 |
| 5,141,636 | 8/1992 | Flanagan et al. | 210/209 |

FOREIGN PATENT DOCUMENTS

| | | | |
|---|---|---|---|
| 0306301 | 1/1988 | European Pat. Off. | C02F 1/30 |
| 0360941 | 10/1988 | European Pat. Off. | B01D 53/34 |
| 0371628 | 3/1989 | European Pat. Off. | C03C 25/02 |
| 3907670 | 9/1989 | Germany | B01J 19/12 |
| 51-14619 | 1/1977 | Japan. | |
| 2165827 | 10/1986 | United Kingdom | B01D 53/34 |

OTHER PUBLICATIONS

Federal Laboratory Technology Application Assessment, "Laser Controlled Decomposition of Chlorofluorocarbons".

J. S. Francisco et al., "Dissociation Pathways of Carbonyl Halides" American Chemical Society, 1989 J. of Phy. Chem., vol. 93, No. 24, 1989 pp. 8118–8122.

Primary Examiner—Donald P. Walsh
Assistant Examiner—Daniel Jenkins
Attorney, Agent, or Firm—Wells, St. John, Roberts, Gregory & Matkin

[57] ABSTRACT

Disclosed is a method of photochemically oxidizing gaseous organic compounds, an apparatus for photochemically oxidizing gaseous organic compounds, a lining insert for an apparatus for photochemically oxidizing gaseous organic compounds, and a method for producing such a lining. The principal method comprises: a) exposing gaseous organic compounds to ultraviolet light to oxidize the gaseous organic compounds into gaseous oxidation products; and b) reacting the gaseous oxidation products with an internal surface of a reaction chamber, the internal surface comprising a dry porous cementitious and chemically sorbent material which is chemically reactive with the gaseous oxidation products, with the gaseous oxidation products being reacted with the dry porous cementitious material to produce solid reaction products incorporated in sidewalls of the chamber.

77 Claims, 12 Drawing Sheets

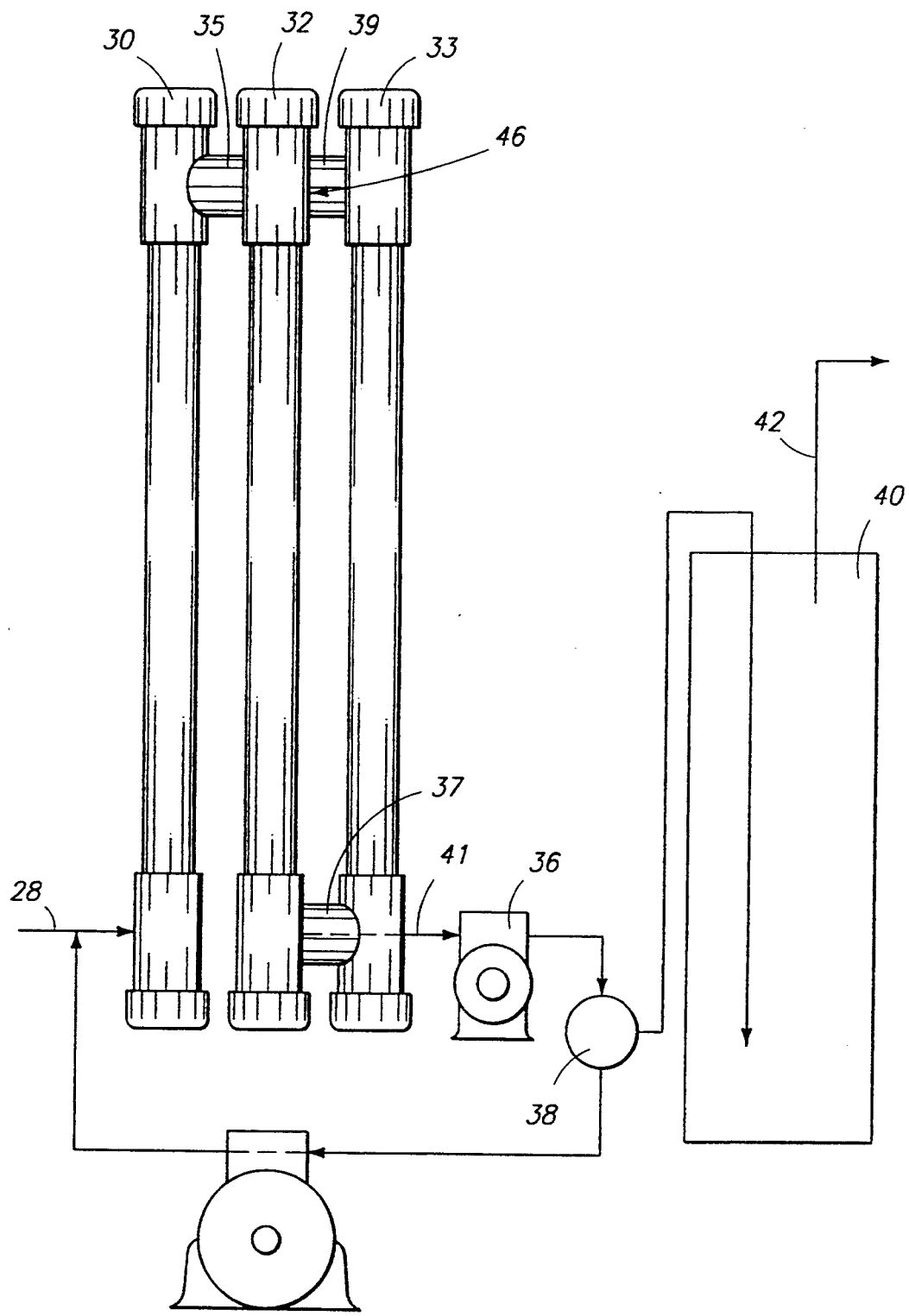

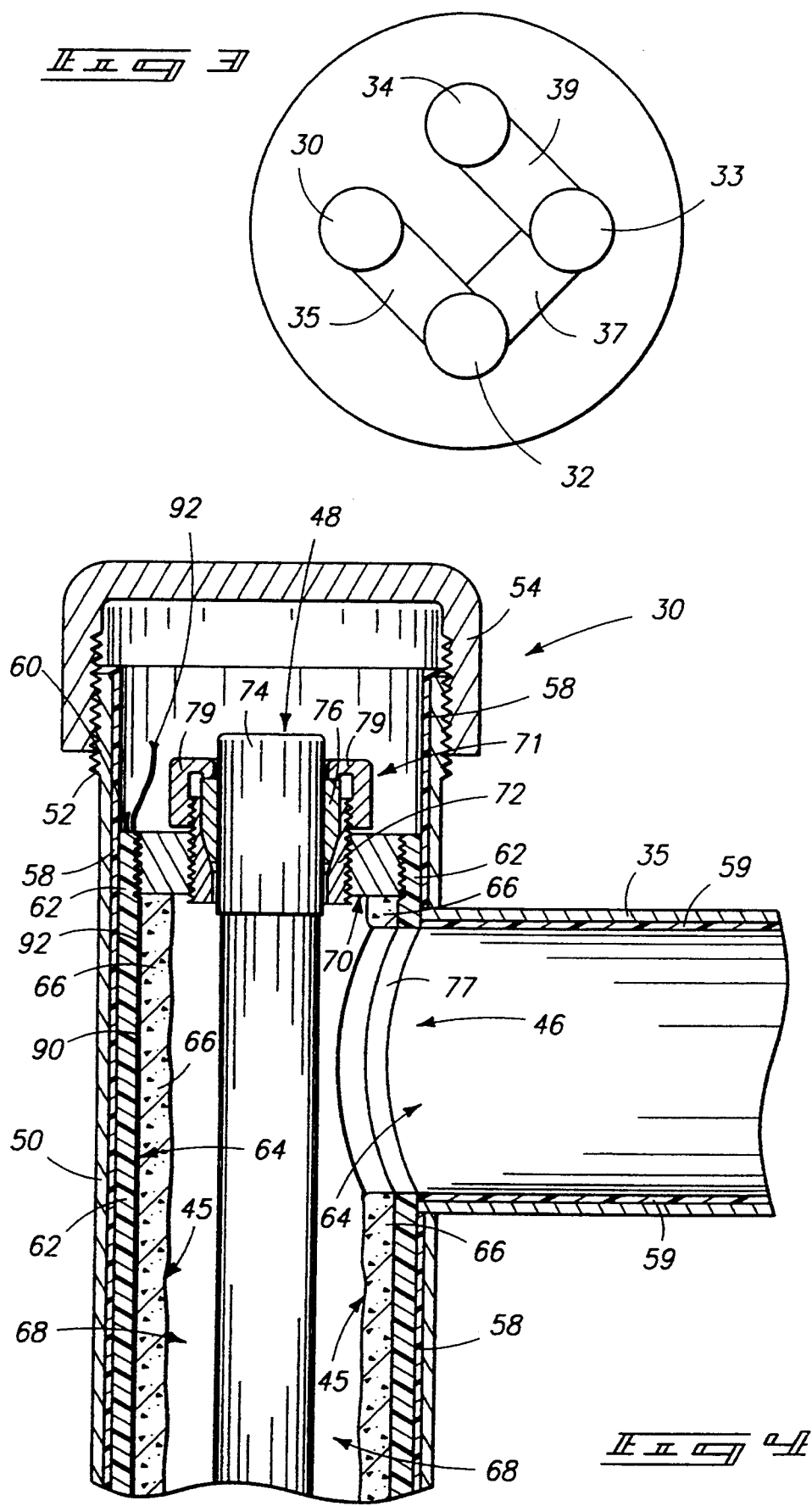

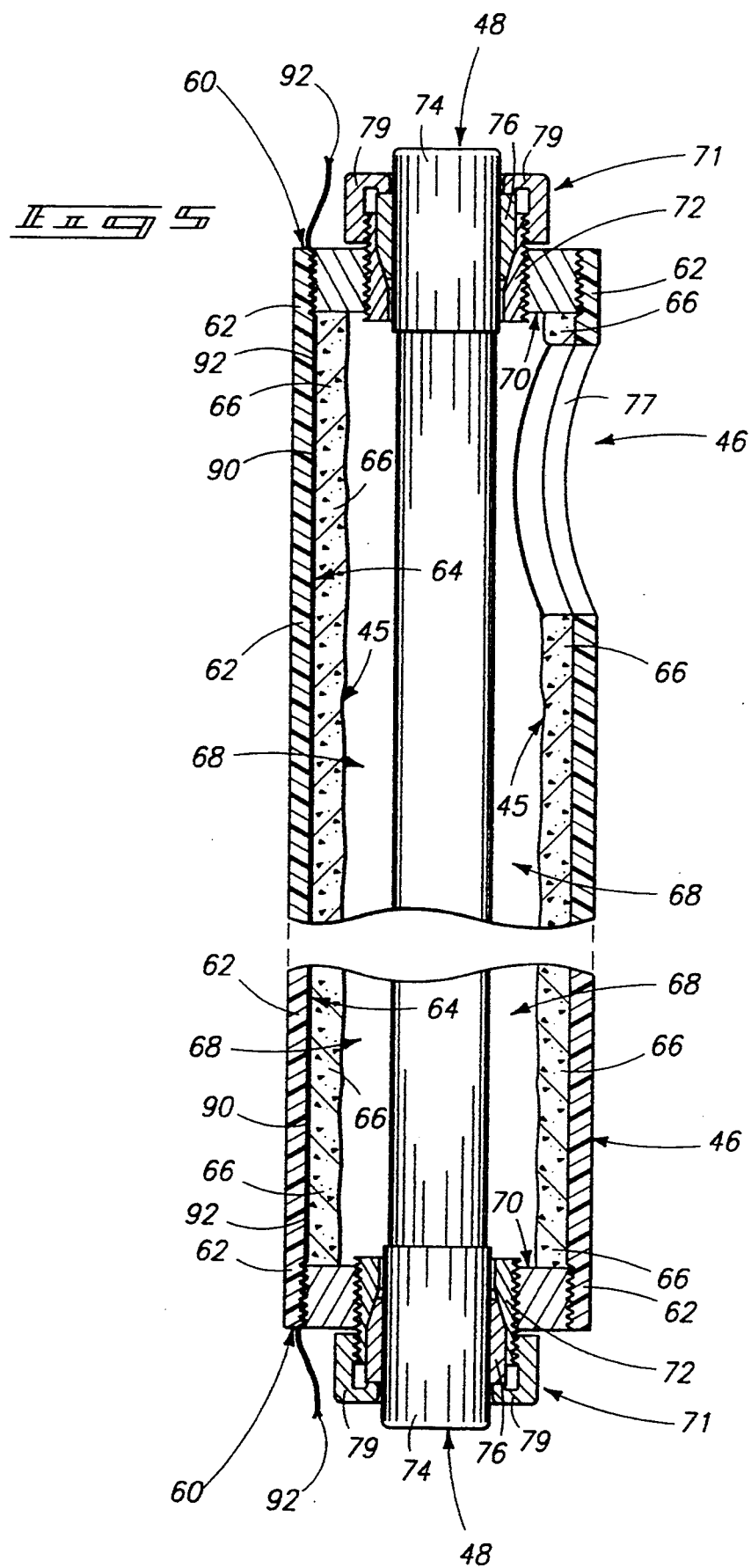

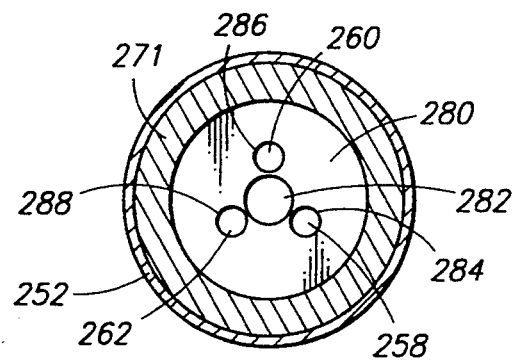
_FIG 15_
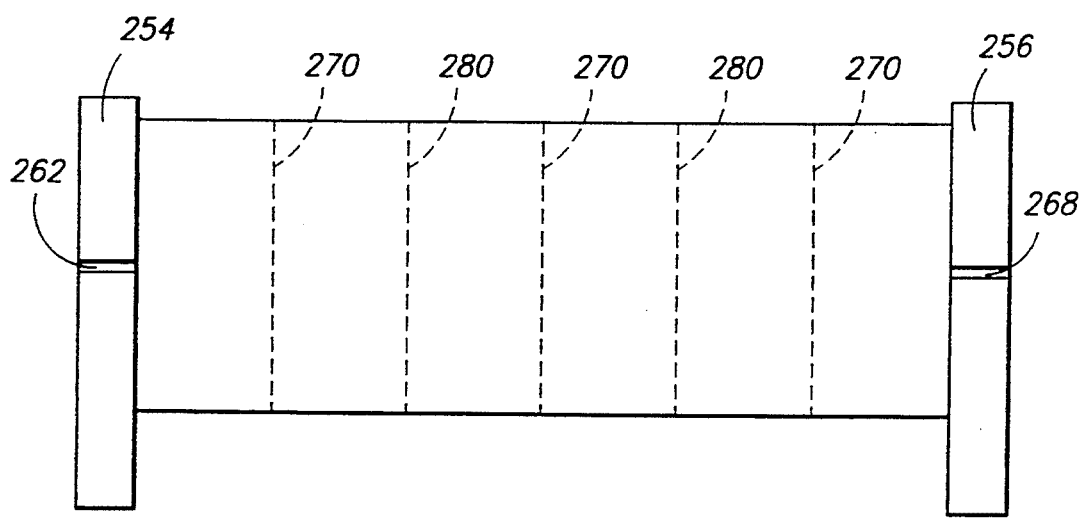
_FIG 16_

METHOD AND APPARATUS FOR USE IN PHOTOCHEMICALLY OXIDIZING GASEOUS ORGANIC COMPOUNDS

RELATED PATENT DATA

This patent resulted from a continuation-in-part application of U.S. patent application Ser. No. 08/078,611, entitled "Method And Apparatus For Use In Photochemically Oxidizing Gaseous Organic Compounds" filed on the same day as the application from which this patent matured and which became U.S. Pat. No. 5,374,404. The above Ser. No. 08/078,611 application was a continuation of U.S. patent application Ser. No. 07/843,422, entitled "Method And Apparatus For Use In Photochemically Oxidizing Gaseous Halogenated Organic Compounds", which is now U.S. Pat. No. 5,260,036.

TECHNICAL FIELD

This invention relates to methods for use in photochemically oxidizing gaseous organic compounds.

BACKGROUND OF THE INVENTION

A fragile and invisible layer of ozone some nine to fifty kilometers above shields the earth's surface against harmful ultraviolet radiation from the sun. It has been discovered that this protective shield is being massively depleted. Such is generally accepted to largely be the result of man-made chemicals that have been and continue to be released into the atmosphere.

Ozone is naturally produced in the stratosphere. Molecular oxygen, $O_2$, is naturally photodissociated into free oxygen atoms under the influence of radiation from the sun. Such production of oxygen atoms leads immediately to the production of ozone molecules as shown in the following equation,.

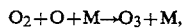

$$O_2 + O + M \rightarrow O_3 + M,$$

where a triple collision between a molecule of oxygen $O_2$, an atom of oxygen O, and a third particle "M", which may be a molecule of oxygen or of nitrogen, which absorbs excess reaction energy and results in formation of a molecule of ozone, $O_3$.

Ozone-depleting chemicals fall into four major groups. The first is known as chlorofluorocarbons (CFC's). These are used as aerosol propellants, refrigerants, blowing agents, solvents and sterilants. Freon-12 (dichlorodifluoromethane) is one example. A second group is known as "halons", which are bromine-containing chemicals used as fire suppressants. A third group is known as chlorocarbons, and include chemicals such as carbon tetrachloride and 1,1,1-trichloromethane. A fourth group consists of relatives of the CFC's called "hydrochlorofluorocarbons" (HCFC's). These are widely used as interim substitutes for some CFC's, and typically have from 2% to 10% of the ozone-destroying power of CFC's.

When released during production and use, it is believed that ozone-depleting chemicals remain in the atmosphere for decades, some even for centuries. Once released, they are atmospherically heated, wind and air current dispersed, and ultimately rise to 10 to 15 kilometers. There, ultraviolet light in the wavelength range of from 170 to 230 nanometers breaks the molecules apart. This releases chlorine, fluorine or bromine which contribute to the destruction of ozone and the formation of ordinary oxygen, a substance which is useless for screening out dangerous ultraviolet radiation from the sun.

Once the molecules are broken, some of the fluorine combines with hydrogen to form HF. Ultimately, the fluorine is precipitated into the lower atmosphere where it ends up in water solution. Carbon freed from the halogenareal organic compounds combines with available oxygen to form $CO_2$. Such is chemically benign, but physically contributes to global warming which is commonly referred to as the "greenhouse effect". Also, the gaseous halogenated organic compounds while in the lower atmosphere on their way to the stratosphere are believed to themselves absorb infrared radiation reflected from the earth's surface, thereby converting it into heat and contributing to global warming. Ozone-depleting chemicals are believed responsible for 20% to 25% of current increases in the greenhouse effect.

Combination of carbon with free oxygen to form $CO_2$ is also believed to adversely affect $O_3$ production. The carbon in essence consumes some of the raw material (free oxygen) out of which $O_3$ is naturally made in the atmosphere.

Free chlorine atoms from the ultraviolet light dissociation of the halogenated organic gases would have a tendency to combine with one another to form chlorine gas ($Cl_2$), but for available free oxygen atoms available in the atmosphere. The pollutant chlorine atoms have a greater tendency to join with free oxygen atoms to form a chlorine oxide ($ClO_x$), again consuming one of the principal raw material (free oxygen) out of which $O_3$ is made.

As the ozone layer is depleted, more harmful ultraviolet radiation reaches the earth's surface. Unless ozone depletion is stopped, adverse global health and environmental consequences on a large scale are predicted to occur. The Environmental Protection Agency (EPA) has predicted that increased ultraviolet radiation from ozone depletion would cause between 163,000,000 and 308,000,000 extra cases of skin cancer in the U.S. alone, among people alive today and born by 2075, if nothing were done to save the ozone layer. About 3.5 to 6.5 million of these cases are predicted to be fatal. More ultraviolet radiation would also cause an estimated 19 to 29 million additional cases of cataracts in this population. Sharp increases in the number and variety of serious immunological disorders are also predicted. Further, damage to the natural environment from increased ultraviolet radiation would range from billions of dollars in reduced crop yields to disruption of the marine food chain.

It is not surprising then that research is underway for substitutes for these gaseous halogenated organic compounds. However, it is estimated that it may take 20 years or more to find acceptable substitutes. Consider that the substitute will need to be benign, non-flammable, stable, inexpensive and safe for use in homes (i.e. for refrigeration and aerosol propellants). Accordingly, people are as well working on techniques for preventing these gaseous halogenated organic compounds from entering the atmosphere.

One potentially promising technique for avoiding release of these gases exposes the objectionable materials to ultraviolet radiation for destruction under controlled conditions. Examples of such techniques are disclosed in U.S. Pat. No. 4,210,503 to Confer and U.S. Pat. No. 4,045,316 to Legan. However, a problem associated with any such reactive systems is how one disposes of the reaction byproducts which are produced by the photochemical oxidation. While CFC's and HCFC's are rather inert to humans, the oxidation products produced by such reactors are very harmful to life. Additionally, the oxidation products can be corrosive, explosive or otherwise harmful or destructive to the reactor system and its components. Accordingly, it would be desirable to develop alternate methods and techniques for contending with the hazardous oxidation byproducts produced by such photochemical oxidations.

The below described and claimed invention is also usable in treatment or disposal of other gaseous organic compounds.

BRIEF DESCRIPTION OF THE DRAWINGS

Preferred embodiments of the invention are described below with reference to the following accompanying drawings.

FIG. 2 is a diagrammatic and side elevational view of photochemical reaction chambers in accordance with the invention.

FIG. 3 is a top, but diagrammatic, view of FIG. 2.

FIG. 4 is a enlarged fragmentary sectional view of an upper portion of one of the photochemical chambers of FIG. 2.

FIG. 5 is a further enlarged diagrammatic view of a liner utilized in the photochemical reaction chambers of FIG. 2.

FIG. 15 is a sectional diagram of an alternate baffle within the FIG. 12 reactor chamber.

FIG. 16 is a diagrammatic representation of alternating baffles employed within a lined reactor chamber in accordance with the invention.

DETAILED DESCRIPTION OF THE PREFERRED EMBODIMENTS

Figure 1:
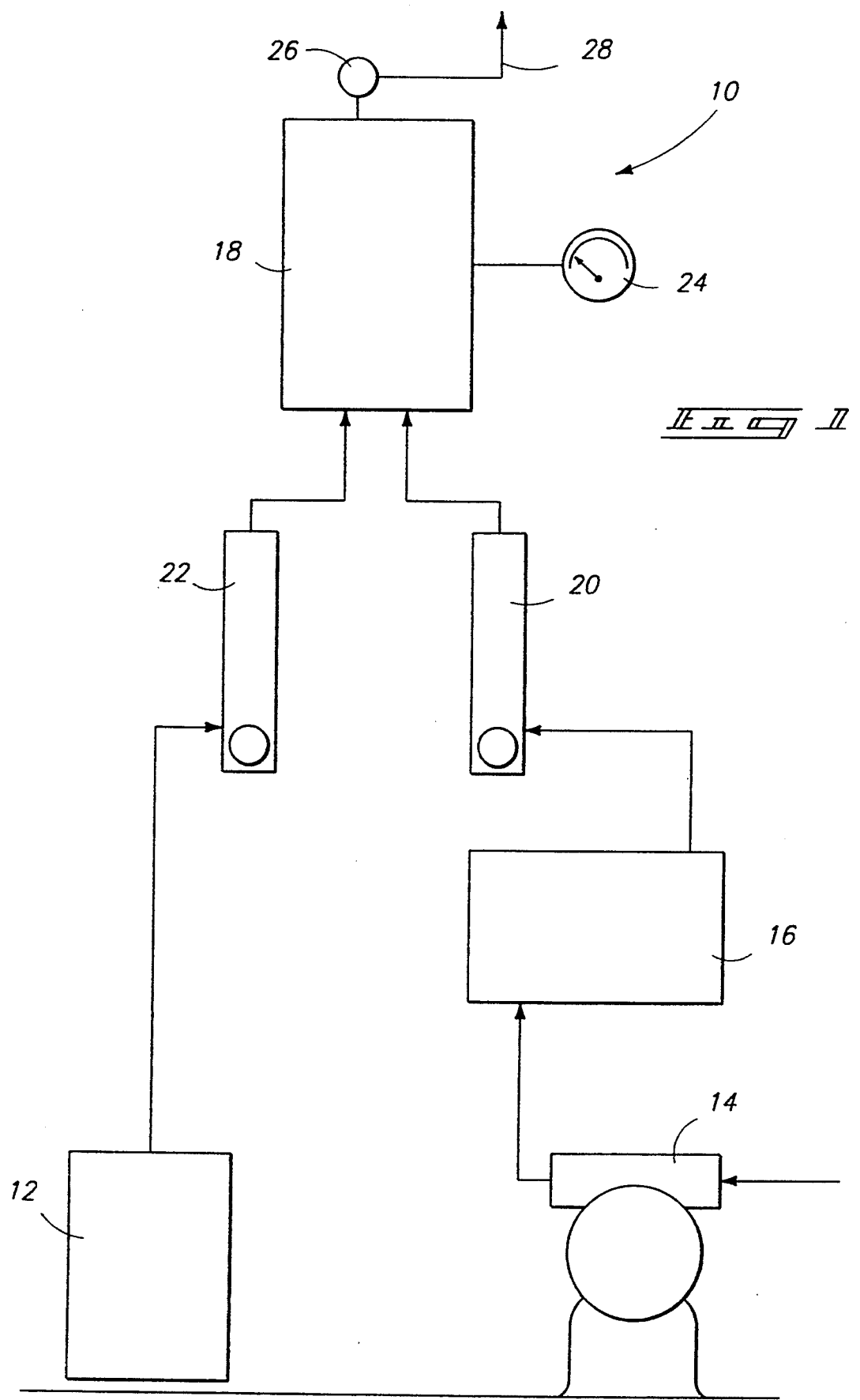
FIG. 1 is a diagram of a portion of a system for carrying out methods in accordance with the invention.

This disclosure of the invention is submitted in furtherance of the constitutional purposes of the U.S. Pat. Laws "to promote the progress of science and useful arts" (Article 1, Section 8).

In accordance with one aspect of the invention, a method of photochemically oxidizing gaseous organic compounds comprises:
  exposing gaseous organic compounds to ultraviolet light to oxidize the gaseous organic compounds into gaseous oxidation products; and
  reacting the gaseous oxidation products with an internal surface of a chamber, the internal surface comprising a dry porous cementitious and chemically sorbent material which is chemically reactive with the gaseous oxidation products, the gaseous oxidation products being reacted with the dry porous cementitious material to produce solid reaction products incorporated in sidewalls of the chamber.

Preferably, the chamber comprises an elongated reaction chamber provided with internal sidewalls effectively lined with the dry porous cementitious and chemically sorbent material. In the context of this document, the word "sorbent material" means a material which chemically or physically adsorbs or absorbs the gaseous oxidation products.

In accordance with another aspect of the invention, an apparatus for photochemically oxidizing gaseous organic compounds comprises:
  an elongated reaction chamber, the reaction chamber having a gas inlet, internal sidewalls and a gas outlet;
  a source of ultraviolet light provided within and along the elongated reaction chamber to oxidize gaseous organic compounds fed to the reaction chamber into gaseous oxidation products; and
  the reaction chamber internal sidewalls comprising a dry porous cementitious and chemically sorbent material, the sorbent material being chemically reactive with the gaseous oxidation products to produce solid reaction products incorporated in the reaction chamber sidewalls.

In accordance with yet another aspect of the invention, a removable reaction chamber liner for a photochemical oxidation reactor apparatus comprises:
  a support shell sized and shaped to be received internally within a photochemical oxidation reactor, the support shell having internal sidewalls which define a pathway for gaseous flow therethrough, the pathway being of sufficient size to receive a source of ultraviolet light sufficient to oxidize gaseous halogenated organic compounds fed to the reaction chamber into gaseous oxidation products; and
  the sidewalls being lined with a dry porous cementitious and chemically sorbent material, the sorbent material being chemically reactive with the gaseous oxidation products to produce solid reaction products incorporated in the lined reaction chamber sidewalls.

In accordance with still a further aspect of the invention, a method of producing such a liner comprises the following steps:
  providing a dry mixture of material, the material comprising:
    from about 20% to 33% by weight alumina based CaO cement;
    from about 0% to 10% by weight added CaO;
    from about 0% to 25% by weight added $Ca(OH)_2$, $Mg(OH)_2$ or mixtures thereof;
    from about 50% to 70% by weight added alumina aggregate;
    from about 0% to 1% by weight of a foaming agent;

combining the dry mixture of material with water in a ratio of water to dry mixture of from about 0.5:1 to 1.65:1 by weight;

mixing the dry mixture and water into a slurry;

applying the slurry to internal sidewalls of a supporting shell; and allowing the slurry to harden on the supporting shell into a dry cementitious material predominately comprising a metastable compound of $CaO.Al_2O_3.xH_2O$.

More particularly and with reference to the figures, FIG. 1 illustrates a mixing and charging system 10 for combining gaseous halogenated organic compounds and oxygen (typically ambient air) for feeding to reaction chambers for processing in accordance with the invention. Such a system might include a storage tank 12 for the gaseous halogenated organic compounds to be treated and an air pump 14 for combining air with the gaseous halogenated organic compounds. Most any gaseous halogenated organic compounds are anticipated to be usable in accordance with the invention. However, those compounds identified in the "Background of the Invention" section of this document are the primary gaseous organic compounds with which the invention was designed and reduced to practice.

Intake air (preferably filtered) would be pumped by air pump 14 to an air dehumidifier 16 for dehumidification. Preferably as much $H_2O$ is moved from the intake air stream as possible. However, the methods of the invention would also function with $H_2O$ present, although at a much slower reaction rate. Gaseous halogenated organic compounds from tank 12 (preferably dried and de-oiled) and from intake air dehumidifier 16 are passed to a mixing chamber 18 through respective flow meters 22, 20. Pressure within mixing chamber 18 would be monitored by a pressure gauge 24, with feed of the mixed gases to the reaction chambers being regulated by a regulator 26. Preferably the reaction mixture exiting tank 18 is provided such that there is from a 33% to 250% molar excess of $O_2$ as compared to the quantity of atoms which form the gaseous halogenated organic compound(s). Yet, photochemical oxidation will occur at the extremes of where there is a negligible quantity of $O_2$ or where the organic compounds are only present in part per million quantities. However, the efficiency and rate of conversion are expected to be considerably less.

FIG. 1 illustrates but one system for selectively mixing desired quantities of oxygen and gaseous halogenated organic compounds to be treated. Alternate systems could of course be developed without departing from the principles and scope of the invention, which are intended to only be limited by the accompanying claims appropriately interpreted in accordance with the Doctrine of Equivalents. The invention is expected to have both large and small scale uses, such as for example in the air conditioning/refrigeration and computer chip industries. A typical small scale use in connection with one part of the air conditioning industry would be in a common automotive service station where Freon or mixed Freons are collected during routine auto air conditioning maintenance. Collected Freons that cannot be recycled could be metered into photooxidation systems to be described subsequently, along with room air, and thereby be treated and disposed of without threat to the environment. Larger computer chip manufacturers typically have condensation or adsorption units in their vent systems that recycle or capture the objectionable halogenated organic compounds, such as Freon-113. Such might utilize a system such as is in part disclosed in FIG. 1.

Referring to FIGS. 2 and 3, the mixed gases exiting through regulator 26 from FIG. 1 can be fed via a line 28 (FIGS. 1 and 2) to a series of four photochemical reaction chambers 30, 32, 33 and 34. A source of ultraviolet light would be positioned within each of chambers 30, 32, 33 and 34, as will be described subsequently. Gas to be treated from line 28 would flow into the lower portion of chamber 30, as indicated by arrow 28 in FIG. 2. The gas mixture would be oxidized by the ultraviolet light source, with reacted and unreacted gas flowing from the upper end of chamber 30 through an interconnecting channel 35 to the top of chamber 32. Gases would flow down chamber 32 for continued reaction of the mixture and across an interconnecting channel 37 to the bottom of chamber 33. From there, reacted and unreacted gases would flow up chamber 33 and across an interconnecting channel 39 to the top of chamber 34, and down chamber 34 to an outlet 41. A recirculation pump 36 and associated recycle control valve 38 can be provided for causing recycle of the reactant and reacted gases, as desired, for substantial oxidation of the halogenated organic compounds. Gaseous product would be fed through valve 38 to a wet chemical scrubber 40 for further capture or reaction therewithin. Thereafter, gas can be vented via a line 42 to the atmosphere or to another system for subsequent treatment, as desired.

The elongated reaction chambers are described in more detail with reference to FIGS. 4 and 5. Each of reaction chambers 30, 32, 33 and 34 are substantially identical, but for interconnection of their respective inlets and outlets to enable the above described gas flow. Chamber 30 is described with reference to FIGS. 4 and 5. Reaction chamber 30 has a gas inlet (FIG. 2) where line 28 enters, a gas outlet 46 defined in part by channel member 35, and effective internal sidewalls 45. A source of ultraviolet light 48 is provided within and along reaction chamber 30 to oxidize gaseous halogenated organic compounds fed thereto into gaseous oxidation products. Internal sidewalls 45 comprise a dry porous cementitious and chemically sorbent material which is chemically reactive with the gaseous oxidation products.

Specifically, reaction chamber 30 is comprised of an elongated stainless steel or other metal sleeve 50 having opposing male threaded ends 52. Only one threaded end 52 is shown in FIG. 4. A complementary metal female cap 54 threads to each end 52 of teflon sleeve 50. Sleeve 50 is provided with an internal coating 58 of a protective material, such as polytetrafluoroethylene. Metal would be rapidly corroded if exposed to the gaseous oxidation products. The polytetrafluoroethylene provides protection to the apparatus should gaseous oxidation products reach sleeve 50. The intent, however, is to prevent any exposure of gaseous oxidation products to lined sleeve 50.

A removable reaction chamber liner 60 is provided immediately inwardly adjacent polytetrafluoroethylene coating 58 within chamber 30 for providing a gas/solid reaction between liner 60 and gaseous oxidation products the result to exposure to ultraviolet light source 48. More particularly, removable reaction chamber liner 60 is comprised of a support shell 62, preferably made of polytetrafluoroethylene, which is sized and shaped to be slidably and snugly received internally within polytetrafluoroethylene coated sleeve 50. In this manner removable liner 60, and all components forming apart thereof, is replaceable and potentially recyclable. Support shell 62 has internal side walls 64 which are coated with a lining 66 comprised of the dry porous cementitious and chemically sorbent material which is chemically reactive with the gaseous oxidation products, thereby producing solid reaction products incorporated into solid lining 66. In the described embodiment, the lining 66 effectively forms or comprises reaction chamber sidewalls 45 which are exposed to the gaseous oxidation products for a gas-solid phase reaction therewith. The composition and application of material 66 is described in more detail below.

Support shell 62 with lining 66 defines a pathway 68 within elongated reactor chamber 30 for gaseous flow, and is of sufficient size to receive and retain ultraviolet light source 48. More particularly, support shell 62 has identical opposed female threaded ends. The illustrated upper end internally receives an externally male threaded end cap apparatus 71 which functions to retain ultraviolet light source 48 and prevent escape of any reactant and reacted gases. An identical end cap apparatus is received at the end opposite the FIG. 4 illustrated end.

End cap apparatus 71 includes a donut shaped component 70 having a threaded central opening provided therethrough, and having external threads which thread relative to threaded end 52 of support shell 62. An elongated and threaded female compression component 72 threads internally to the central opening provided in first donut 70. Compression component 72 projects upwardly relative to first donut 70. A central opening, inwardly tapered from the top, is provided internally through compression component 72. A wedge shaped hollow male compression ring 76 is slidably received within the tapered central compression component 72 opening. An elongated ultraviolet lamp 74, which defines ultraviolet light source 48, extends slidably through the central opening in compression component 72 and within compression ring 76. Lamp 74 preferably produces ultraviolet light in the wavelength of approximately 185 nanometers. An example would be 64-inch long 65 watt quartz enveloped ultraviolet light tubes which are commercially available from, for example, Atlantic Ultraviolet Corporation of Long Island, N.Y. A compression cap 79 threads to compression component 72 and engages ring 76 for creating a compression seal against lamp 76.

A cross member cutout 77 is provided through support shell 62 and lining 66 as shown for alignment with cross piece 35. Cross piece 35 is shown lined with polytetrafluoroethylene layer 59. In addition, although not shown, the cross pieces are also preferably provided with separate, snug-fitting replaceable polytetrafluoroethylene shells lined with material 66 for reaction with the oxidized reaction products. Additionally, the cross pieces can be constructed to connect with the associated sleeve 50 by any suitable means, such as with pipe unions, flange and bolt covers, etc.

It is expected that lining 66, upon reaction to produce incorporated solid reaction products, will ultimately be degraded by the gaseous oxidation products to the point of appreciable corrosion signifying its end of life. To monitor the life of lining material 66, and correspondingly the life of removable liner 60, a sensor is interposed between internal sidewall 64 of support shell 62 and dry porous cementitious material 66. The sensor is comprised of a material which is reactive with the gaseous oxidation products upon exhaustion and degradation of the overlying dry porous cementitious chemically sorbent material of liner 66. The sensor is comprised of a strip of metal tape 90 which extends along the length of shell 60 between sidewall 64 and beneath lining 66. An example material for tape 90 would be copper. Conductive leads, such as lead 92, are connected to opposite ends of tape strip 90. Such leads would be connected to a resistance meter which would provide a small source of monitored electric current. Upon complete corrosion through and across strip 90, infinite resistance would be registered clearly indicating that the gaseous oxidation products had permeated the spent lining 66.

As one alternative to copper strip 90 and a resistance measurement, a bimetal circuit material could be provided that would generate a milliamp current which could be monitored by an amp meter. Changes in amperage would be indicative of the presence of gaseous oxidation products which have permeated lining 66. Any such indication would indicate that replacement of replaceable liner 60 was in order. Note that support shell 62 might be recycled by stripping spent cementitious material 66 therefrom, and reusing shell 62 for another application of such material. Also preferably, but not shown, a similar sensor circuit could be positioned between shell 62 and lining 58 of sleeve 50 in an effort to detect any gaseous oxidation products which would indicate faulty operation. As well, a sensor would preferably be provided in association with cross piece 35.

Figure 9:
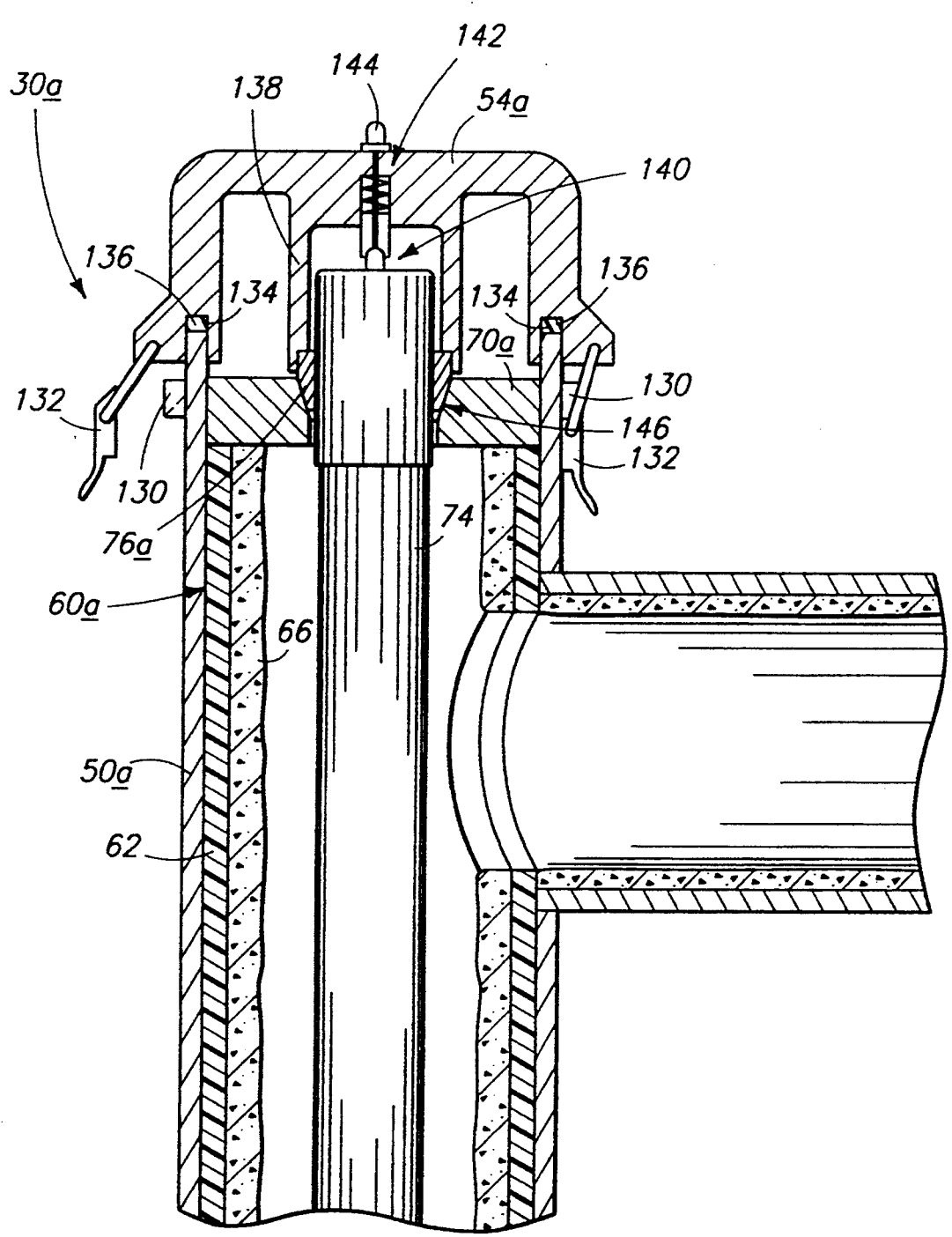
FIG. 9 is an enlarged fragmentary view of an alternate embodiment reaction chamber and liner in accordance with the invention.

An alternate embodiment reaction chamber 30a and associated liner 60a is shown and described with reference to FIG. 9. Such construction is analogous to the first described embodiment, but replaces the threading of various components with clamping action. Here, sleeve 50a is provided with a pair of external clamp retainers 130. A modified cap 54a is fitted with an opposing pair of external clamps 132 which engage with retainers 130. Cap 54a includes an annular groove 134 sized to receive the end of sleeve 50a. A gasket 136 is provided in groove 134 for sealing engagement relative to cap 54a and sleeve 50a. Cap 54a is also provided with a central projecting cylinder 138 having an opening 140 therein which receives the end of ultraviolet light 74. A conventional spring biased electrical connection 142 is provided at the base of cylinder 138. An external post 144 would be connected to a suitable power source for energizing light 74.

Figure 10:
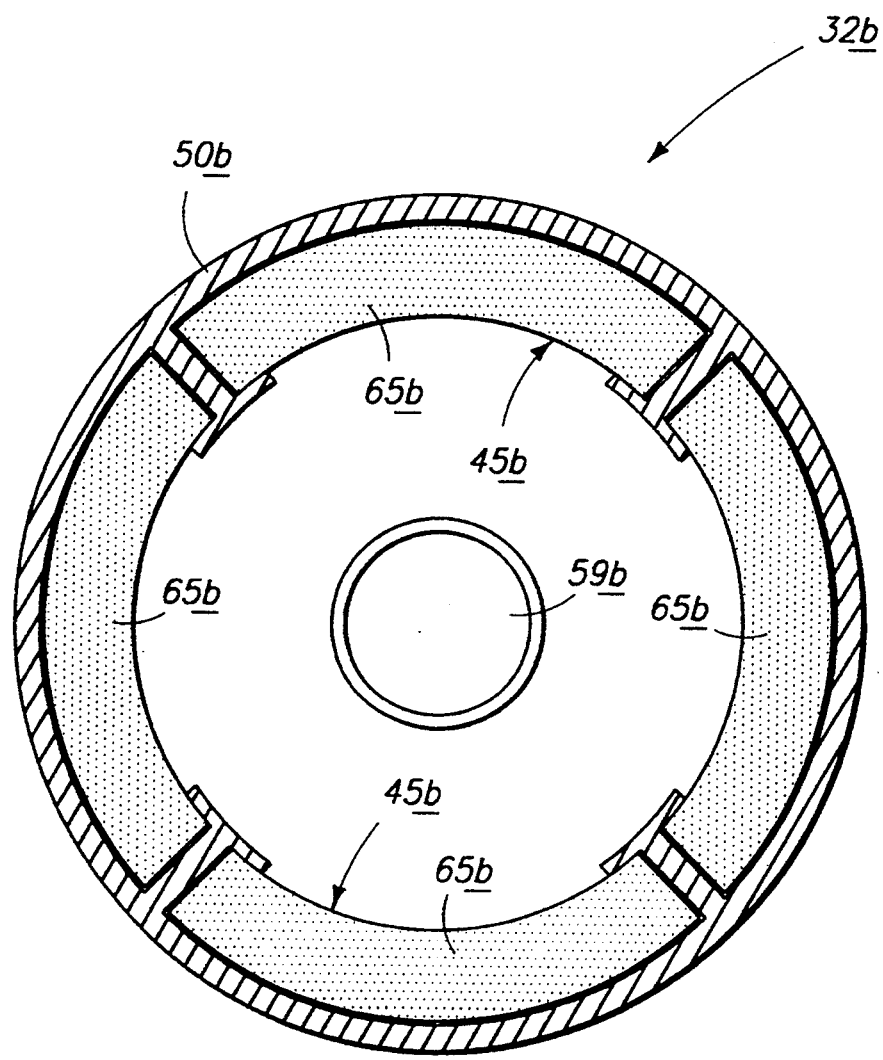
FIG. 10 is a cross-section of another alternate embodiment reaction chamber liner in accordance with the invention.

Support shell 62a of lining component 60a is provided with blunt non-threaded ends. A compression component 70a is clamped in place against the blunt end of shell 60a by cap 54a, as shown. Component 70a is provided with a central conical opening 146 which receives a conical compression insert 76a. Central projecting cylinder 138 of cap 54a is sized and shaped to provide a suitable downward clamping force against insert 76a for retaining and sealing relative to light 74 when clamps 132 engages clamp retainers 130. The embodiment of FIG. 10 illustrates but one alternate example for sealing the end of a reaction chamber. Alternate methods could of course be used, for example, draw clamps, overcenter cams, a flange with bolt circle, tie rods, collet and lock ring, etc.

Where the gaseous halogenated organic compounds fed to the reaction chamber include chlorocarbons, fluorocarbons, chlorofluorocarbons and hydrochlorofluorocarbons, typical gaseous oxidation products from HFC and CFC exposure to ultraviolet light are expected to include $Cl_2$, $F_2$, $C_xO_yF_z$, $C_xO_yCl_z$, HCl and HF, among potential others. To react with such products, the dry porous cementitious material of layer or lining 66 preferably comprises a calcium based cement having induced porosity to maximize available surface area. Most preferably, the calcium based cement as solidified will comprise a metastable compound of $CaO \cdot Al_2O_3 \cdot xH_2O$, where "x" may be anywhere from 1 to 6. Also preferably, the calcium based cement will be produced by having added basic constituents such as $Ca(OH)_2$ and $Mg(OH)_2$ or mixtures thereof. Where the gaseous organic compounds being oxidized include fluorine and chlorine containing compounds, the ultraviolet light will oxidize the feed material to highly reactive fluorine and chlorine containing radicals which will produce solid reaction products within lining 66 comprising $CaF_2$, $CaFCl$, $CaCl_2$, $MgF_2$, $MgFCl$, or $MgCl_2$, and perhaps other solid reaction products.

The preferred dry mixture for making the cementitious material comprises from about 20% to 33% by weight of an alumina based CaO cement. Preferably, added CaO is provided up to an additional 10 weight percent of the dry mixture. Also preferably, added $Ca(OH)_2$, $Mg(OH)_2$ or mixtures thereof is provided up to 25% by weight of the dry mixture. The dry mixture also preferably includes alumina aggregate at between 50% to 70% by weight.

Preferably, a foaming agent is also added in an effective mount to impart foaming in the resultant slurry and corresponding porosity in the hardened material. The intent is to produce a porous composite having a density from about 0.5 $g/cm_2$ to about 3 $g/cm_2$. Elemental aluminum is one example of a material which will induce such porosity.

The resultant product provides a porous, basic constituent for reacting with the largely acidic radical oxidation products produced by the photooxidation. The added CaO, $Ca(OH)_2$ or $Mg(OH)_2$ provide added basic components for reaction and neutralization of the oxidized products produced by the ultraviolet light. Preferably the amount of silicon in the form of $SiO_2$ or others in the cementitious material is minimized in an effort to avoid formation of hazardous gaseous silicon chlorides or silicon fluorides.

A lining in accordance with the above parameters was produced from the following dry powder composition, by weight:

|  |  |
|---|---|
| Fondu ™ cement | 25% |
| CaO | 10% |
| Ca(OH)$_2$ | 14.25% |
| Al$_2$O$_3$ | 50% |
| Al | 0.75% |
| Total | 100% |

Fondu ™ cement is a trademark composition sold by the Fondu International Company of Chesapeake, Va. Its composition is understood to comprise,

|  |  |
|---|---|
| Al$_2$O$_3$ | 40% |
| TiO$_2$ | <2% |
| CaO | 38% |
| Fe$_2$O$_3$ | 11% |
| FeO | 4% |
| SiO$_2$ | <5% |

The dry powder composition was mixed with water in a weight ratio of water to dry mixture of 1.65:1. Preferably, the weight ratio of water to dry mixture is from about 0.5:1 to 1.65:1, with the lower end of this range being preferred. The dry mixture and water are then thoroughly mixed into a slurry and then spun internally onto a spinning support shell. For example, a support tube spun at between 50 to 100 rpms was internally coated by applying the slurry with a syringe to provide a 5 to 10 millimeter thick layer. The tube was allowed to spin for approximately one hour after application until the material adequately set, and then the spinning was stopped. The tube was then exposed to steam for approximately 24 hours to maximize the amount of hydrated water incorporated in the finished lining. Then, the tube was dried at 100° C. for and additional 25 hours in the absence of any water vapor to fully cure the lining.

The invention was reduced to practice utilizing a gas mixture of gaseous halogenated organic material (5% by volume) and ambient air (95% by volume) which was oxidized by a 184.9 nanometer ultraviolet light source. The major reaction product peak was identified as $COF_2$. Additionally, a larger number of other yet unidentified peaks by chromatography were also developed. However, when the dry chemical liner of the invention was in place, none of these peaks were observed by gas chromatography, indicating that chemical reaction or incorporation into the lining had occurred.

The effects of the photochemical oxidation process on the dry chemical lining, though not fully characterized, were evaluated using scanning electron microscopy (SEM) and semi-quantitative energy dispersive X-ray spectroscopy (EDXS) elemental analysis. The SEM evaluations of dry liners before and after exposure demonstrate observable changes in the crystalline structure of the dry chemical liner. Specifically in most all cases, the $Ca(OH)_2$ crystals observed before exposure could not be observed after exposure. The hexagonal $CaO \cdot Al_2O_3$ plates also demonstrated substantial change in shape. The EDXS evaluation of the material indicated a significant increase in elemental chlorine after exposure. Elemental fluorine is something which is not observable by EDXS, and accordingly could not be observed.

Figure 6:
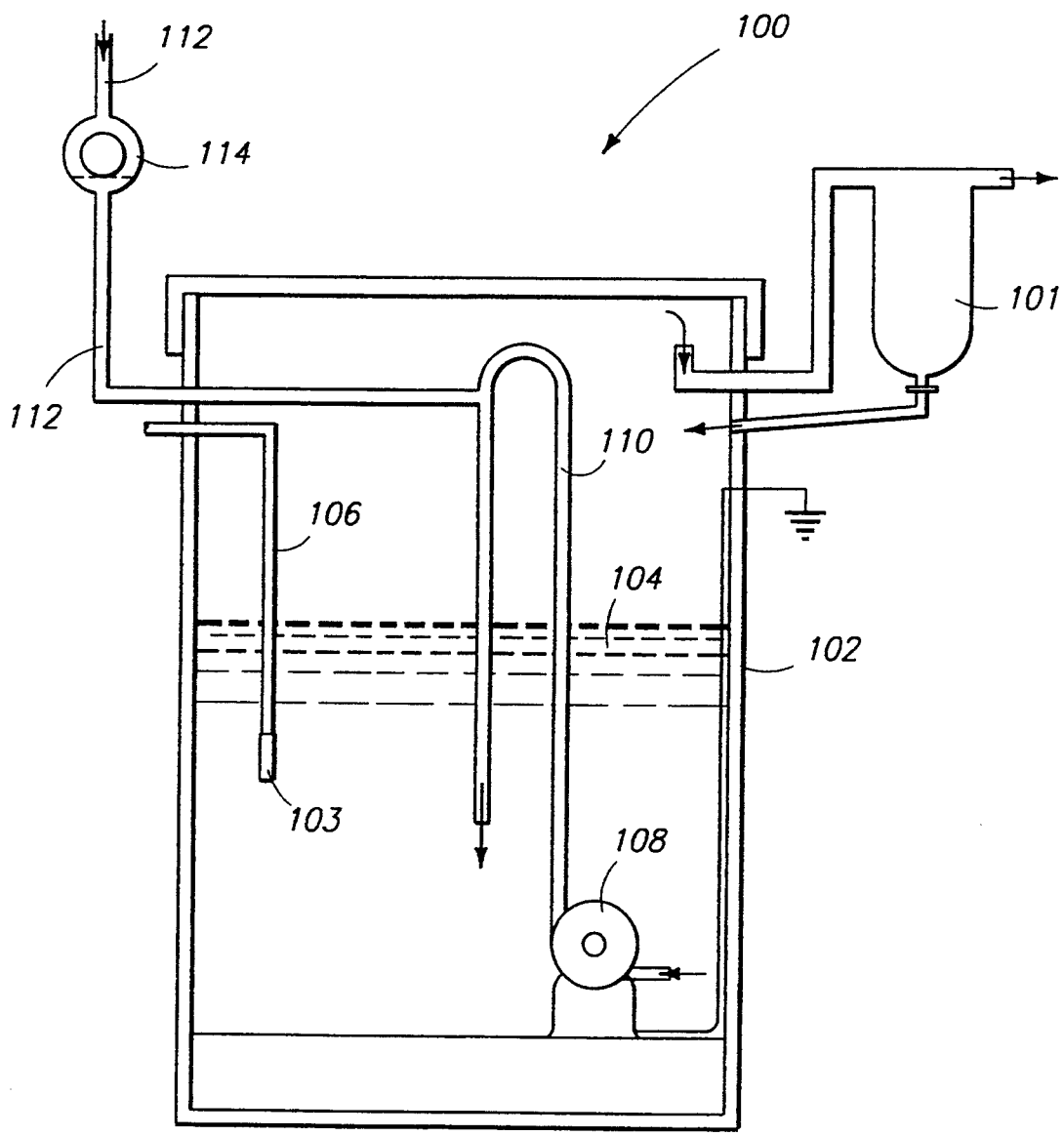
FIG. 6 is a diagram of a wet chemical scrubber utilized in accordance with the system and method of the invention.

Referring again briefly to FIG. 2, wet chemical scrubber 40 is provided to catch any gaseous oxidation products which pass through the reaction chambers without reacting with the liner side walls. A more detailed example of a preferred scrubber is indicated generally by reference numeral 100 in FIG. 6. Scrubber 100 is comprised of a enclosed tank 102 which retains a quantity of an alkaline solution 104. Solution 104 preferably comprises a 0.1–5.0 molar solution of, for example, $Ca(OH)_2$, $Na(OH)_2$, $Mg(OH)_2$ $NH_3(OH)_2$, or mixtures thereof, to provide a pH of approximately 11–13. Exhaust gases are fed to scrubber 100 through a line 112 which passes through a check valve 114. Preferably, a suction pressure pump (not shown) is provided upstream of valve 114 to assure complete evacuation of the reaction chambers. Check valve 114 prevents back flow of any fluid into the photochemical reaction chambers. Line 112 is fed to a looped line 110 through which alkaline solution 104 in tank 102 is pumped by a pump 108. Such provides a pressure drop in line 110 where it meets with line 112, thereby drawing the exhaust gases into the scrubber. As well, the fluid emitted into alkaline solution 104 from line 110 facilitates intermixing of the alkaline solution and gas supplied thereto.

The gaseous products fed to scrubber 100 are expected to include $COF_2$, $COClF$, $F_2$, $Cl_2$, $ClO$, $HCl$, $HF$, and potentially any unreacted gaseous halogenated organic compounds. All of such components, except the gaseous halogenated organic compounds, are essentially reacted with either the linings 66 or retained in alkaline solution 104 of reaction in scrubber 100. Gas exiting tank 102 passes through a vapor trap and return 101. A pH monitor 103 is utilized to monitor pH of solution 104.

Figure 7:
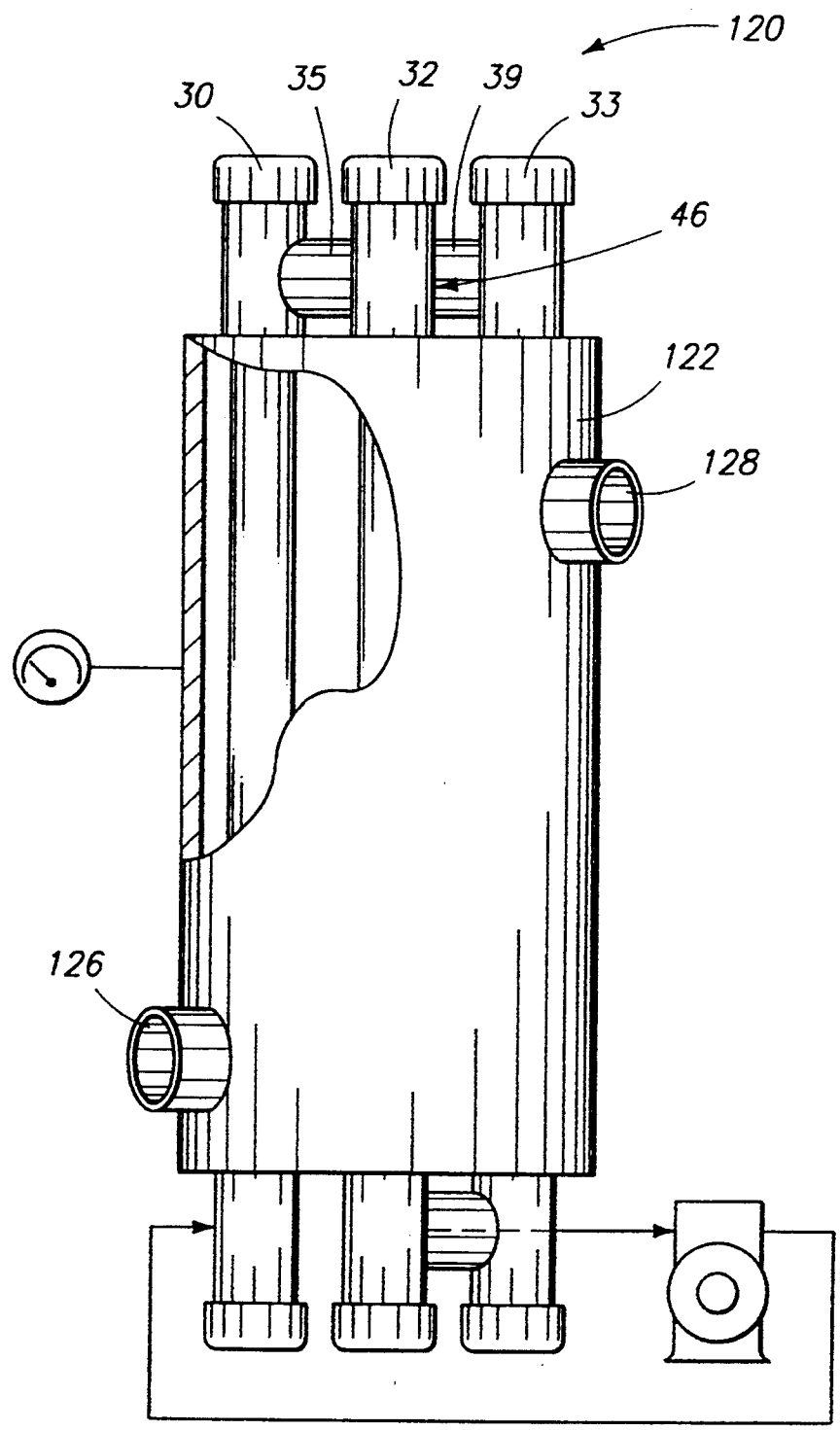
FIG. 7 is a fragmentary, cut-away view of an alternate embodiment system in accordance with the invention.
Figure 8:
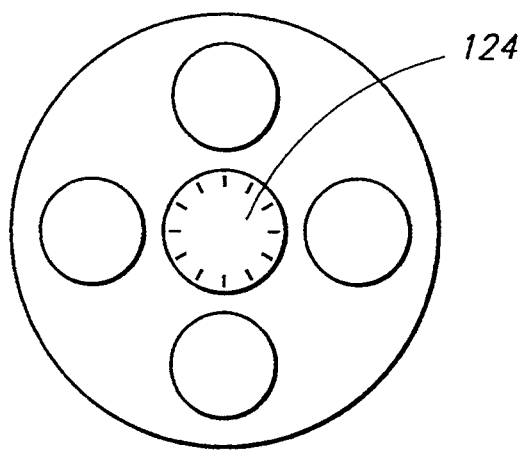
FIG. 8 is a top view of the reaction chamber section of FIG. 7.

It is anticipated that the ultraviolet light sources will produce considerable heat which must be removed. FIGS. 7 and 8 illustrate a cooling jacket 122 provided about reaction chambers 30, 32, 33 and 34 which are here surrounded by a fluid tight cooling jacket 122. Cooling jacket 122 receives a cooling fluid through orifice 126 and emits heated fluid through orifice 128 for cooling the reaction chambers. An isolated central tube 124 (FIG. 8) as well passes through jacket 122. Ambient air or some other fluid is preferably blown through tube 124 for added heat dissipation.

An alternate embodiment reaction chamber 32b is shown in cross-section in FIG. 10. Chamber 32b comprises an extruded sleeve 50b, preferably comprised of polytetrafluoroethylene, having inward projecting components 63b. A central opening 59b at the end of sleeve 50b is provided for retaining an ultraviolet light source. Components 63b define elongated slots or cavities which retain a plurality of discrete elongated segments 65b which are comprised of the dry porous cementitious and chemically sorbent material. As illustrated, projecting components 63b retain segments 65b in juxtaposition to define effective internal reaction chamber sidewalls 45b which react with the gaseous oxidation products. Segments 65b would be separately fabricated and then slid into the slots or cavities. The segments would therefore also be replaceable. Alternate constructions could of course be utilized without departing from the principles and scope of the invention. By way of example only, segments could be provided in the form of rods or other shapes to effectively provide a lining for reaction with the gaseous oxidation products.

Figure 11:
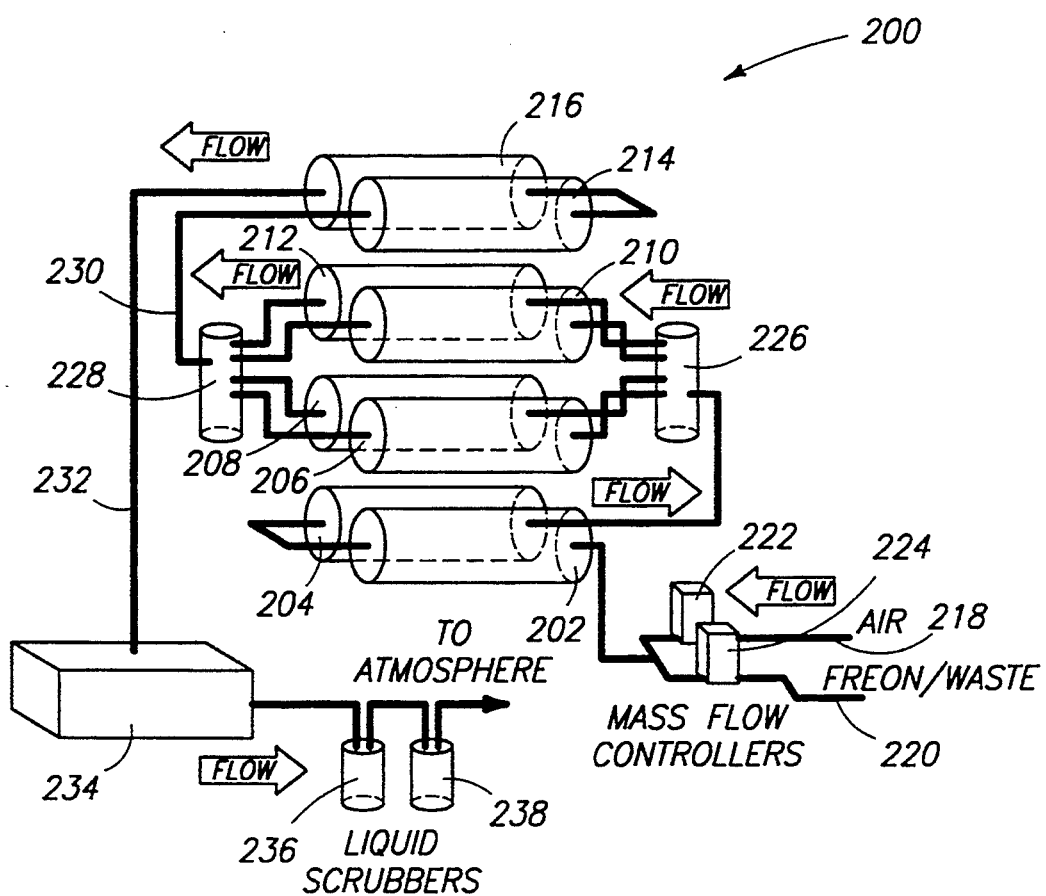
FIG. 11 is a diagrammatic representation of an alternate reactor system in accordance with the invention.

Preferably, the above described constructions and methods utilize multiple light sources in an elongated reactor, with multiple chambers, and flow restricting baffles to maximize organic gas mixture and exposure to ultraviolet light and the lining of the reactor. For example, FIG. 11 illustrates but one example of an alternate system 200. System 200 includes multiple cementitious lined reaction chambers 202, 204, 206, 208, 210, 212, 214, and 216. Such would each include one or more elongated ultraviolet light sources for the photodissociation reactions. Air and an organic source to be treated would be provided to the system by lines 218 and 220, respectively. Freon is shown as flowing into line 220, although other or additional gaseous organic compounds of course might be fed via line 220. Lines 218 and 220 feed to mass flow controllers 222, 224, respectively. The outputs of such mass flow controllers are combined into a single line for serial continuous passage through reactor chamber 202, followed by flow through reactor chamber 204.

Gaseous material flowing from reactor chamber 204 is fed to a flow splitter 226 which feeds gas in a parallel manner through lined reaction chambers 206, 208, 210, and 212. Gaseous material flowing from such chambers is recombined into a single line 230 by flow combining device 228. Line 230 then serially feeds through first the reaction chamber 214 and then through flow chamber 216, as shown. A line 232 from reactor chamber 216 feeds to an FT-IR 234, with outlet flow therefrom passing through liquid scrubbers 236 and 238 to the atmosphere.

Such provides but one alternate process flow combining serial and parallel flows in a continuous, non-reflow system. Other designs would, of course, be usable without departing from the principles and scope of the invention.

Figure 12:
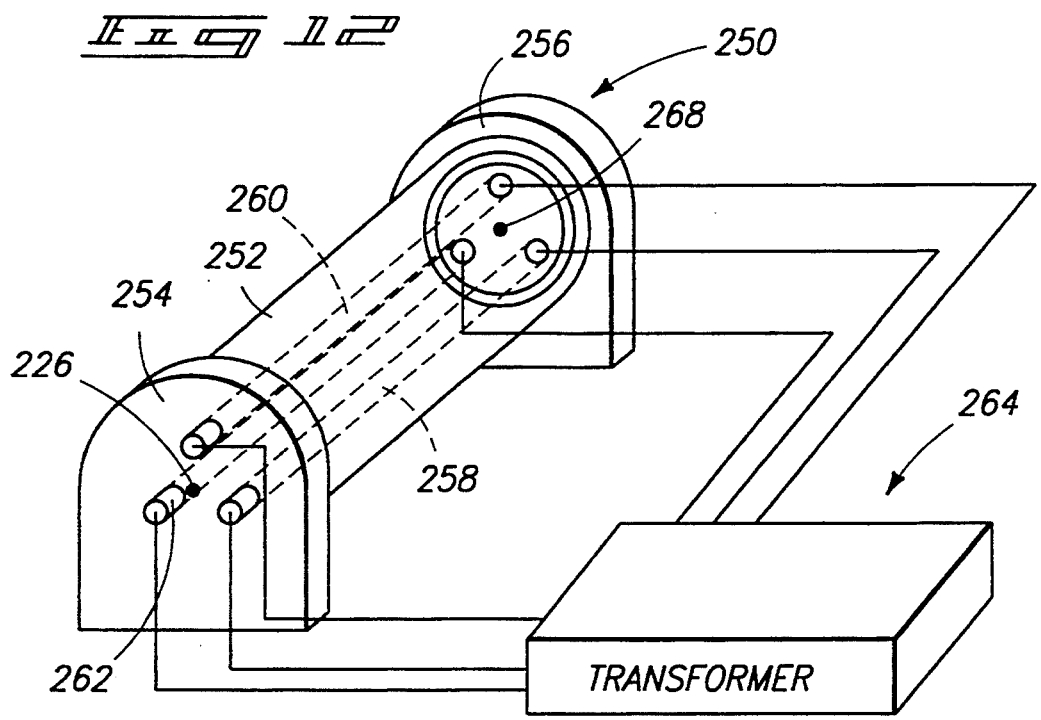
FIG. 12 is a diagram of a reactor in accordance with the invention.

FIG. 12 is a diagrammatic representation of an alternate embodiment reactor chamber 250 in accordance with the invention. Chamber 250 is comprised of an elongated sleeve 252 interconnected at its respective ends to a pair of vertical supports 254 and 256. A series of three ultraviolet light tubes 258, 260, and 262 are internally received equiangularly through and along sleeve 252, and supported at their respective ends. A transformer 264 and associated wiring interconnects with the ultraviolet light sources for providing necessary electricity. A central inlet opening 266 is provided through support 254 internally to within sleeve 252 and the UV light sources, while a corresponding outlet 268 is centrally provided relative to sleeve 252 and through support 256.

Figure 13:
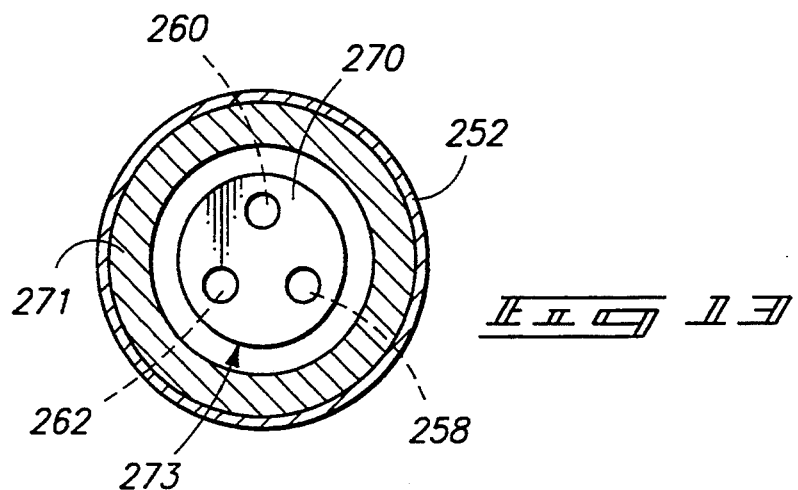
FIG. 13 is a sectional diagram of a baffle within the FIG. 12 reactor chamber.
Figure 14:
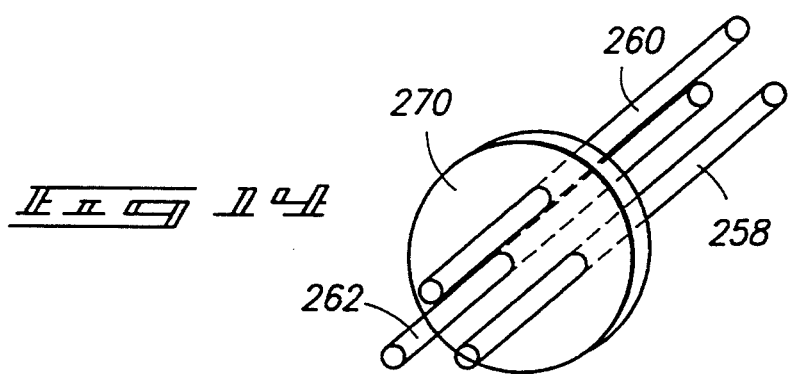
FIG. 14 is a diagrammatic perspective view of the baffle of FIG. 13 and ultraviolet lamps.

FIGS. 13, 14, and 15 illustrate baffling preferably associated internally with reactor sleeve 252. FIGS. 13 and 14 illustrate one such baffle 270, while FIG. 15 illustrates an alternate baffle 280. Preferably, the FIGS. 13 and 14 baffle is used in combination and alternatingly along the length of reactor chamber 252 with the baffle of FIG. 15.

Referring first to FIGS. 13 and 14, reactor sleeve 252 is appropriately lined with a cementitious sorbent material as described above, to provide an internal reactive liner 271. Baffle 270 is received within chamber 252 internally of liner 271, and includes three openings through which each of lamps 258, 260, and 262 are received. Baffle 270 is centrally positioned relative to the internal portion of the reactor chamber internal of liner 270, and there retained by the UV lamps, such that gases are caused to flow externally outward, toward and against liner 271. Accordingly, a void space 273 is provided radially outward of baffle 270 from liner 271.

FIG. 15 illustrates alternate baffle 280 designed to force gas flow centrally. Specifically, baffle apparatus 280 is in the form of an annular ring or donut having a central aperture 282. Light sources 258, 260, and 262 are received within three respective holes 284, 286, and 288 formed within and through baffle plate 280.

FIG. 16 illustrates preferred alternate positionings of baffles 270 and 280 along the length of reactor sleeve 252. Such is intended to provide or result in better gas mixing for dissociation by the elongated UV light sources and exposure to the external sidewalls. Such results in an alternating flow towards the liner and towards the center, which provides flow restriction for maximizing exposure of gas flow through the reactor to both the light sources and the lining, as well as promoting gas intermixing.

Process Control

The following is provided to illustrate example controls for operating the preferred embodiment equipment. The control of the stoichiometric relationship between the halogenated organic compounds and oxygen could be controlled through any number of means. One example would be to start with an evacuated chamber use an absolute manometer to regulate the partial pressure of each component of the mixture. An alternative method would be to use a dedicated infrared spectrometer attached to a computer monitored operating valving system that would adjust the concentration of the halogenated organic compounds and oxygen to predetermine concentrations. Another alternative would be to use a gas chromatograph in a similar manner. Other monitoring/control systems could of course be utilized.

Once the optimum concentration of halogenated organic compounds and air (oxygen) has been reached in the premixing chamber (optional), a computer activated or manual valve could be opened that would allow the photochemical reaction chambers to be charged with the premixed gases. This charging process could be enhanced by having a reduced pressure in the photochemical reactor and a slightly elevated pressure in the premixing chamber. To assist in the circumstances, the scrubber unit is preferably provided with an aspirator vacuum line (as described above), which could also be attached to the reaction chamber exhaust line. Scrubber systems are of course optional, with the invention only being limited by the concluding claims. The reaction chamber exhaust line would be closed by a valve while the gas mixture was being treated and opened upon determination that halogenated organic compounds were no longer present in the chamber.

The in situ determination of halogenated organic compound concentration during treatment could also be accomplished by several instrumental methods as well as by predetermined rates of destruction values. The preferred method is expected to utilize an instrumental method that monitors the disappearance of the halogenated organic compounds during reaction. A dedicated infrared spectrometer would probably function well in this capacity although other instrumental controls could easily be substituted. This system of monitoring the reaction process should also save, either to a computer or hard copy, the record of the reaction for environmental monitoring concerns.

The wet chemical wash system is also envisioned as being monitored. The preferred method would be as described above by using an in situ pH electrodes. As long as the pH of the basic solutions remain above 7.0, they would still be effective. When the monitor determines that the pH is approaching 7.0, a feedback loop should notify the operator and insure that no additional operation of the device is possible until the pH has been returned to establish parameters. This will insure against any unreacted harmful gases passing through the scrubber system.

Two additional monitoring systems that are capable of preventing operation of the device are envisioned. One of these is the previously described resistance circuit designed into the dry chemical liners. Upon failure of this monitoring circuit, the chemical liner may be considered exhausted and no longer capable of protecting the reaction chamber walls. This chemical activity monitor is envisioned as being monitored by computer and capable of preventing operation of the reaction chambers when not within specified parameters. The final control system envisioned will monitor the circuitry of the UV lamps. Should a lamp or series of lamps fail, this monitor would either compensate by increasing time of exposure of gases to the reaction chambers, or prevent operation of the photochemical reactor.

The above method and constructions, although principally presented relative to gaseous halogenated organic compounds, are also useful in treating other organic compounds provided in a gaseous form. Such include, by way of example only, volatile or semi-volatile organic compounds. In the context of this document, a volatile organic compound is one which has a vapor pressure of more than about $10^{-4}$ Torr, while a semi-volatile organic compound is one which has a vapor pressure of from about $10^{-4}$ to $10^{-8}$ Torr. Exemplary of these and other organic compounds are hydrocarbons; substituted hydrocarbons containing one or more substituted oxygen, sulfur, phosphorus or nitrogen atoms; organic acids; alkanes; alkenes; aromatics; esters; aldehydes; ethers; carboxylic acids; alcohols; heterocyclics and ketones. Specific examples include benzenes, pyrenes, anthracenes, pthalates, pthalenes, toluenes, napthalenes, hexanones, xylenes, benzidines, phenols, hydrazines, butanones, hexanes, anthrenes and amines, or mixtures thereof. Even more specific examples include:

Benzene
Benzo[A]pyrene
Pyridine
Ethane
Propane
Ethylene
Propylene
Butyl alcohol
Benzyl alcohol
Dibenzo[A,H]anthracene
Formaldehyde
Acetal Aldehyde
Di-N-butyl phthalate
Toluene
Benzo[A]anthracene
Benzo[E]pyrene
Di[2-ethylhexyl]phthalate
Naphthalene
2-Hexanone
Ethyl benzene
Xylene
Trinitrotoluene
Benzidine
Acetic acid
Benzoic acid
1,3,5-Trinitrobenzene
N-nitrosidi-N-propylamine
Phenol
Chrysene
Formic acid
Acetone
Acrolein
Endrin aldehyde
Hydrazine
Perylene
Carbophenothion
2,4-Dinitrophenol
Acenaphthene
2-Methylnaphthalene
2,4-Dimethylphenol
Butyl benzyl phthalate
1,2-Diphenylhydrazine
2-Butanone Indeno[1,2,3-cd]pyrene
Hexane
Phenanthrene
Pyrene
N-nitrosodiphenylamine
Cyclotrinethylenetrinitramine [RDX]
Ethyl ether
N-nitrosodiphenylamine
2,6-Dinitrotoluene
Parathion
Dinitrotoluene
4-Nitrophenol
Methyl isobutyl ketone
Picric acid
Dimethoate
Carbofuran
Pentaerythritoltetranitrate (PETN)
Tetraethyl Lead
Formaldehyde
Anthracene
Methyl-t-butyl-ether
Di-n-octyl phthalate
Trinitrophenylmethylnitramine
M-xylene
Tetrahydrofuran
P-xylene
Isopropanol
1-Methylnaphthalene
1,3-Butadiene
Dibenzofuran
Isopropyl ether
Dimethyl formamide
2,3-Benzofuran
Nitrobenzene
Benzo[g,h,i]perylene The mechanism by which gaseous organic compounds, such as those above, react and become incorporated into the cementitious lining is believed to be as follows:

$$O_2 + h\nu(\lambda < 200 \text{ nm}) \rightarrow 2O.(^3P)$$

$$O.(^3P) + O_2 \rightarrow O_3$$

$$O_3 + h\nu(\lambda < 200 \text{ nm}) \rightarrow O_2 + O.(^1D)$$

$$O.(^1D) + H_2O \rightarrow 2OH.$$

$$RH + OH. \rightarrow R. + H_2O$$

$$R. + O_2 \rightarrow RO_2.$$

$$RO_2. + O_3 \rightarrow RO. + 2O_2$$

$$RO_2. + \text{liner} \rightarrow \text{compound incorporated in liner}$$

$$RO. + \text{liner} \rightarrow \text{compound incorporated in liner}$$

$$R. + \text{liner} \rightarrow \text{compound incorporated in liner}$$

where "R." is an organic radical, "RO." is an alkoxy radical, "$RO_2$." is an alkperoxy radical, "$O.(^3P)$" is a ground electronic state oxygen atom, "$O.(^1D)$" is an excited electronic state oxygen atom, "$O_3$" is ozone, and "OH." is hydroxyl radical.

Example 1

Gaseous benzene is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 2

Gaseous benzo[a]pyrene is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 3

Gaseous p-xylene is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 4

Gaseous di-n-butyl phthalate is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 5

Gaseous toluene is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 6

Gaseous benzo[a]anthracene is injected into an elongated reactor having multiple ultraviolet lights positioned therein and lined with a cementitious liner as described above. Temperature in the reactor is between 70° C. and 100° C. Pressure is at or slightly above atmospheric pressure. Such oxidizes into gaseous oxidation products. The gaseous oxidation products chemically react with and thereby incorporate into the solid cementitious liner.

Example 7

Gaseous 1,2-dibromoethane is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation

Example 8

Gaseous naphthalene is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 9

Gaseous 2-hexanone is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 10

Gaseous n-nitrosodi-n-propylamine is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 11

Gaseous parathion is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 12

Gaseous acenaphthene is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 13

Gaseous hexane is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 14

Gaseous pyrene is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 15

Gaseous ethyl ether is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 16

Gaseous methyl isobutyl keytone is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 17

Gaseous tetraethyl lead is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 18

Gaseous polychlorinated biphenyls are is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 19

Gaseous polybrominated biphenyls are injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 20

Gaseous o-xylene is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 21

Gaseous diethly pthalate is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 22

Gaseous isobutyl alcohol is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 21

Gaseous formic acid is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 22

Gaseous DDT, P,P'- is injected into an elongated reactor having 20 multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 23

Gaseous DDE, P,P'- is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 24

Gaseous DDD, P,P'- is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

Example 25

Gaseous methyl bromide is injected into an elongated reactor having multiple ultraviolet lights positioned therein and lined with a cementitious liner as described above. Temperature in the reactor is between 40° C. and 100° C. Pressure is at or slightly above atmospheric pressure. Such oxidizes into gaseous oxidation products. The gaseous oxidation products chemically react with and thereby incorporate into the solid cementitious liner.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An apparatus for photochemically oxidizing gaseous volatile or semi-volatile organic compounds comprising:

an elongated reaction chamber, the reaction chamber having a gas inlet, internal sidewalls and a gas outlet;

a source of ultraviolet light provided within and along the elongated reaction chamber to oxidize gaseous volatile or semi-volatile organic compounds fed to the reaction chamber into gaseous oxidation products; and the reaction chamber internal sidewalls comprising a dry porous cementitious and chemically sorbent material, the sorbent material being chemically reactive with the gaseous oxidation products to produce solid reaction products incorporated in the reaction chamber sidewalls.

2. The apparatus of claim 1 further comprising a plurality of gas flow restricting baffles positioned within and along the elongated reaction chamber.

3. The apparatus of claim 1 further comprising a plurality of gas flow restricting baffles positioned within and along the elongated reaction chamber, the gas flow restricting baffles being alternatingly shaped along the chamber to direct gas flow toward the sidewalls then toward the chamber center.

4. A removable reaction chamber liner for a photochemical oxidation reactor apparatus for oxidizing gaseous volatile or semi-volatile organic compounds, the liner comprising:

a support shell sized and shaped to be received internally within a photochemical oxidation reactor, the support shell having internal sidewalls which define a pathway for gaseous flow therethrough, the pathway being of sufficient size to receive a source of ultraviolet light sufficient to oxidize gaseous volatile or semi-volatile organic compounds fed to the reaction chamber into gaseous oxidation products; and the sidewalls being lined with a dry porous cementitious and chemically sorbent material, the sorbent material being chemically reactive with the gaseous oxidation products to produce solid reaction products incorporated in the lined reaction chamber sidewalls.

5. A method of photochemically oxidizing gaseous volatile or semi-volatile organic compounds comprising:

feeding gaseous volatile or semi-volatile organic compounds to an elongated reaction chamber having a source of ultraviolet light provided internally within the chamber, the reaction chamber having internal sidewalls;

exposing the gaseous volatile or semi-volatile organic compounds to ultraviolet light within the chamber to oxidize the gaseous volatile or semi-volatile organic compounds into gaseous oxidation products; and reacting the gaseous oxidation products with a lining of the reaction chamber, the lining comprising a dry porous cementitious and chemically sorbent material which lines the reaction chamber and is chemically reactive with the gaseous oxidation products, the gaseous oxidation products being reacted with the lining material to produce solid reaction products incorporated in the lined reaction chamber sidewalls.

6. The method of photochemically oxidizing gaseous volatile or semi-volatile organic compounds of claim 5 further comprising restricting the flow of gas through the elongated reaction chamber with flow restricting baffles.

7. The method of photochemically oxidizing gaseous volatile or semi-volatile organic compounds of claim 5 further comprising restricting the flow of gas through the elongated reaction chamber with flow restricting baffles, and further using a plurality of such flow restricting baffles to alternatingly direct gas flow toward the internal sidewalls and toward the center of the reactor.

8. The method of photochemically oxidizing gaseous volatile or semi-volatile organic compounds of claim 5 wherein the gaseous volatile or semi-volatile organic compounds are selected from the group consisting of hydrocarbons.

9. The method of photochemically oxidizing gaseous volatile or semi-volatile organic compounds of claim 5 wherein the gaseous volatile or semi-volatile organic compounds are selected from the group consisting of substituted hydrocarbons containing one or more substituted oxygen, sulfur, phosphorus or nitrogen atoms.

10. The method of photochemically oxidizing gaseous volatile or semi-volatile organic compounds of claim 5 wherein the gaseous volatile or semi-volatile organic compounds are selected from the group consisting of alkanes, organic acids, alkenes, aromatics, esters, aldehydes, ethers, carboxylic acids, alcohols and ketones.

11. The method of photochemically oxidizing gaseous volatile or semi-volatile organic compounds of claim 5 wherein the lining is supported on a reusable support shell, the method further comprising removing spent dry porous cementitious and chemically sorbent material incorporating solid reaction products and recycling the reusable support shell for subsequent use in the method of claim 5.

12. A method of photochemically oxidizing gaseous volatile or semi-volatile organic compounds comprising:

exposing gaseous volatile or semi-volatile organic compounds to ultraviolet light to oxidize the gaseous volatile or semi-volatile organic compounds into gaseous oxidation products; and reacting the gaseous oxidation products with an internal surface of a chamber, the internal surface comprising a dry porous cementitious and chemically sorbent material which is chemically reactive with the gaseous oxidation products, the gaseous oxidation products being reacted with the dry porous cementitious material to produce solid reaction products incorporated in sidewalls of the chamber.

13. The method of photochemically oxidizing gaseous volatile or semi-volatile organic compounds of claim 12 wherein the gaseous volatile or semi-volatile organic compounds are selected from the group consisting of hydrocarbons.

14. The method of photochemically oxidizing gaseous volatile or semi-volatile organic compounds of claim 12 wherein the gaseous volatile or semi-volatile organic compounds are selected from the group consisting of substituted hydrocarbons containing one or more substituted oxygen, sulphur, phosphorus or nitrogen atoms.

15. The method of photochemically oxidizing gaseous volatile or semi-volatile organic compounds of claim 12 wherein the gaseous volatile or semi-volatile organic compounds are selected from the group consisting of alkanes, organic acids, alkenes, aromatics, esters, aldehydes, ethers, carboxylic acids, alcohols and ketones.

16. The method of photochemically oxidizing gaseous volatile or semi-volatile organic compounds of claim 12 wherein the dry porous cementitious material is supported on a reusable support shell, the method further comprising removing spent dry porous cementitious and chemically sorbent material incorporating solid reaction products and recycling the reusable support shell for subsequent use in the method of claim 12.

17. A method of photochemically oxidizing gaseous heterocyclic organic compounds comprising:

feeding gaseous heterocyclic organic compounds to an elongated reaction chamber having a source of ultraviolet light provided internally within the chamber, the reaction chamber having internal sidewalls;

exposing the gaseous heterocyclic organic compounds to ultraviolet light within the chamber to oxidize the gaseous heterocyclic organic compounds into gaseous oxidation products; and reacting the gaseous oxidation products with a lining of the reaction chamber, the lining comprising a dry porous cementitious and chemically sorbent material which lines the reaction chamber and is chemically reactive with the gaseous oxidation products, the gaseous oxidation products being reacted with the lining material to produce solid reaction products incorporated in the lined reaction chamber sidewalls.

18. The method of photochemically oxidizing gaseous heterocyclic organic compounds of claim 17 wherein the gaseous heterocyclic organic compound comprises pyridine.

19. A method of photochemically oxidizing gaseous heterocyclic organic compounds comprising:
   exposing gaseous heterocyclic organic compounds to ultraviolet light to oxidize the gaseous heterocyclic organic compounds into gaseous oxidation products; and
   reacting the gaseous oxidation products with an internal surface of a chamber, the internal surface comprising a dry porous cementitious and chemically sorbent material which is chemically reactive with the gaseous oxidation products, the gaseous oxidation products being reacted with the dry porous cementitious material to produce solid reaction products incorporated in sidewalls of the chamber.

20. The method of photochemically oxidizing gaseous heterocyclic organic compounds of claim 19 wherein the gaseous heterocyclic organic compound comprises pyridine.

21. A method of photochemically oxidizing a gaseous benzene comprising:
   exposing the gaseous benzene to ultraviolet light to oxidize the gaseous benzene into gaseous oxidation products; and
   reacting the gaseous oxidation products with an internal surface of a chamber, the internal surface comprising a dry porous cementitious and chemically sorbent material which is chemically reactive with the gaseous oxidation products, the gaseous oxidation products being reacted with the dry porous cementitious material to produce solid reaction products incorporated in sidewalls of the chamber.

22. A method of photochemically oxidizing a gaseous napthalene comprising:
   exposing the gaseous napthalene to ultraviolet light to oxidize the gaseous napthalene into gaseous oxidation products; and
   reacting the gaseous oxidation products with an internal surface of a chamber, the internal surface comprising a dry porous cementitious and chemically sorbent material which is chemically reactive with the gaseous oxidation products, the gaseous oxidation products being reacted with the dry porous cementitious material to produce solid reaction products incorporated in sidewalls of the chamber.

23. A method of preparing a lining for a reactor for photochemically oxidizing gaseous organic compounds, the lining being reactive with gaseous oxidation products produced by the photochemical oxidation of the gaseous organic compounds, the method comprising the following steps:
   providing a dry mixture of material, the material comprising:
      from about 20% to 33% by weight alumina based CaO cement;
      from about 0% to 10% by weight added CaO;
      from about 0% to 25% by weight added $Ca(OH)_2$, $Mg(OH)_2$ or mixtures thereof;
      from about 50% to 70% by weight added alumina aggregate;
      from about 0% to 1% by weight of a foaming agent;
   combining the dry mixture of material with water in a ratio of water to dry mixture of from about 0.5:1 to 1.65:1 by weight;
   mixing the dry mixture and water into a slurry;
   applying the slurry to internal sidewalls of a supporting shell; and
   allowing the slurry to harden on the supporting shell into a dry cementitious material predominately comprising a metastable compound of $CaO.Al_2O_3.xH_2O$.

24. The apparatus of claim 1 wherein the dry porous cementitious material comprises a calcium based cement.

25. The apparatus of claim 1 wherein the dry porous cementitious material comprises a metastable compound of $CaO.Al_2O_3.xH_2O$.

26. The apparatus of claim 1 wherein the elongated reaction chamber includes a removable liner which defines the internal reaction chamber sidewalls, the dry porous cementitious and chemically sorbent material lining internal sidewalls of the removable liner.

27. The apparatus of claim 1 wherein the elongated reaction chamber includes a removable liner which defines the internal reaction chamber sidewalls, the dry porous cementitious and chemically sorbent material lining internal sidewalls of the removable liner, and the dry porous cementitious material comprises a metastable compound of $CaO.Al_2O_3.xH_2O$.

28. The apparatus of claim 1 comprising multiple elongated reaction chambers.

29. The apparatus of claim 1 comprising multiple elongated reaction chambers, the multiple elongated reaction chambers being arranged to provide a combination of serial and parallel gas flows.

30. The apparatus of claim 1 wherein the source of ultraviolet light comprises multiple elongated ultraviolet light tubes.

31. The apparatus of claim 1 wherein the source of ultraviolet light comprises at least one elongated ultraviolet light tube, the apparatus further comprising a plurality of gas flow restricting baffles positioned within and along the elongated reaction chamber, at least some of the baffles being supported substantially by the at least one elongated ultraviolet light tube.

32. The apparatus of claim 1 wherein the source of ultraviolet light comprises multiple elongated ultraviolet light tubes, the apparatus further comprising a plurality of gas flow restricting baffles positioned within and along the elongated reaction chamber, at least some of the baffles being supported substantially by the multiple elongated ultraviolet light tubes.

33. The removable reaction chamber liner of claim 4 wherein the dry porous cementitious material comprises a calcium based cement.

34. The removable reaction chamber liner of claim 4 wherein the dry porous cementitious material comprises a metastable compound of $CaO.Al_2O_3.xH_2O$.

35. The method of claim 5 wherein the dry porous cementitious material comprises a calcium based cement.

36. The method of claim 5 wherein the dry porous cementitious material comprises a metastable compound of $CaO.Al_2O_3.xH_2O$.

37. The method of claim 5 comprising feeding the compounds through multiple elongated reaction chambers.

38. The method of claim 5 comprising feeding the compounds through multiple elongated reaction chambers which are arranged to provide a combination of serial and parallel gas flows.

39. The method of claim 12 wherein the dry porous cementitious material comprises a calcium based cement.

40. The method of claim 12 wherein the dry porous cementitious material comprises a metastable compound of $CaO \cdot Al_2O_3 \cdot xH_2O$.

41. The method of claim 17 wherein the dry porous cementitious material comprises a calcium based cement.

42. The method of claim 17 wherein the dry porous cementitious material comprises a metastable compound of $CaO \cdot Al_2O_3 \cdot xH_2O$.

43. The method of claim 19 wherein the dry porous cementitious material comprises a calcium based cement.

44. The method of claim 19 wherein the dry porous cementitious material comprises a metastable compound of $CaO \cdot Al_2O_3 \cdot xH_2O$.

45. The method of claim 21 wherein the dry porous cementitious material comprises a calcium based cement.

46. The method of claim 21 wherein the dry porous cementitious material comprises a metastable compound of $CaO \cdot Al_2O_3 \cdot xH_2O$.

47. The method of claim 22 wherein the dry porous cementitious material comprises a calcium based cement.

48. The method of claim 22 wherein the dry porous cementitious material comprises a metastable compound of $CaO \cdot Al_2O_3 \cdot xH_2O$.

49. A lining produced by the process of claim 23.

50. The method of preparing a lining of claim 23 further comprising providing an effective amount of the foaming agent in the mixture to impart foaming in the slurry and corresponding porosity in the hardened material to produce a hardened material density from about 0.5 $g/cm^3$ to about 3 $g/cm^3$.

51. A lining produced by the process of claim 50.

52. The method of preparing a lining of claim 23 further comprising hardening the slurry on the supporting shell in the presence of steam at a temperature of 100° C. or greater to maximize incorporation of hydrated water into the hardened material.

53. A lining produced by the process of claim 52.

54. The method of photochemically oxidizing gaseous volatile or semi-volatile organic compounds of claim 12 wherein the gaseous volatile or semi-volatile organic compounds comprises an alkane.

55. The method of photochemically oxidizing gaseous volatile or semi-volatile organic compounds of claim 12 wherein the gaseous volatile or semi-volatile organic compounds comprises an organic acid.

56. The method of photochemically oxidizing gaseous volatile or semi-volatile organic compounds of claim 12 wherein the gaseous volatile or semi-volatile organic compounds comprises an alkene.

57. The method of photochemically oxidizing gaseous volatile or semi-volatile organic compounds of claim 12 wherein the gaseous volatile or semi-volatile organic compounds comprises an aromatic.

58. The method of photochemically oxidizing gaseous volatile or semi-volatile organic compounds of claim 12 wherein the gaseous volatile or semi-volatile organic compounds comprises an ester.

59. The method of photochemically oxidizing gaseous volatile or semi-volatile organic compounds of claim 12 wherein the gaseous volatile or semi-volatile organic compounds comprises an aldehyde.

60. The method of photochemically oxidizing gaseous volatile or semi-volatile organic compounds of claim 12 wherein the gaseous volatile or semi-volatile organic compounds comprises an ether.

61. The method of photochemically oxidizing gaseous volatile or semi-volatile organic compounds of claim 12 wherein the gaseous volatile or semi-volatile organic compounds comprises a carboxylic acid.

62. The method of photochemically oxidizing gaseous volatile or semi-volatile organic compounds of claim 12 wherein the gaseous volatile or semi-volatile organic compounds comprises an alcohol.

63. The method of photochemically oxidizing gaseous volatile or semi-volatile organic compounds of claim 12 wherein the gaseous volatile or semi-volatile organic compounds comprises a ketone.

64. A method of photochemically oxidizing a gaseous pyrene comprising:
exposing the gaseous pyrene to ultraviolet light to oxidize the gaseous pyrene into gaseous oxidation products; and
reacting the gaseous oxidation products with an internal surface of a chamber, the internal surface comprising a dry porous cementitious and chemically sorbent material which is chemically reactive with the gaseous oxidation products, the gaseous oxidation products being reacted with the dry porous cementitious material to produce solid reaction products incorporated in sidewalls of the chamber.

65. A method of photochemically oxidizing a gaseous anthracene comprising:
exposing the gaseous anthracene to ultraviolet light to oxidize the gaseous anthracene into gaseous oxidation products; and
reacting the gaseous oxidation products with an internal surface of a chamber, the internal surface comprising a dry porous cementitious and chemically sorbent material which is chemically reactive with the gaseous oxidation products, the gaseous oxidation products being reacted with the dry porous cementitious material to produce solid reaction products incorporated in sidewalls of the chamber.

66. A method of photochemically oxidizing a gaseous pthalate comprising:
exposing the gaseous pthalate to ultraviolet light to oxidize the gaseous pthalate into gaseous oxidation products; and
reacting the gaseous oxidation products with an internal surface of a chamber, the internal surface comprising a dry porous cementitious and chemically sorbent material which is chemically reactive with the gaseous oxidation products, the gaseous oxidation products being reacted with the dry porous cementitious material to produce solid reaction products incorporated in sidewalls of the chamber.

67. A method of photochemically oxidizing a gaseous pthalene comprising:
exposing the gaseous pthalene to ultraviolet light to oxidize the gaseous pthalene into gaseous oxidation products; and
reacting the gaseous oxidation products with an internal surface of a chamber, the internal surface comprising a dry porous cementitious and chemically sorbent material which is chemically reactive with the gaseous oxidation products, the gaseous oxidation products being reacted with the dry porous cementitious material to produce solid reaction products incorporated in sidewalls of the chamber.

68. A method of photochemically oxidizing a gaseous toluene comprising:

exposing the gaseous toluene to ultraviolet light to oxidize the gaseous toluene into gaseous oxidation products; and reacting the gaseous oxidation products with an internal surface of a chamber, the internal surface comprising a dry porous cementitious and chemically sorbent material which is chemically reactive with the gaseous oxidation products, the gaseous oxidation products being reacted with the dry porous cementitious material to produce solid reaction products incorporated in sidewalls of the chamber.

69. A method of photochemically oxidizing a gaseous hexanone comprising:

exposing the gaseous hexanone to ultraviolet light to oxidize the gaseous hexanone into gaseous oxidation products; and reacting the gaseous oxidation products with an internal surface of a chamber, the internal surface comprising a dry porous cementitious and chemically sorbent material which is chemically reactive with the gaseous oxidation products, the gaseous oxidation products being reacted with the dry porous cementitious material to produce solid reaction products incorporated in sidewalls of the chamber.

70. A method of photochemically oxidizing a gaseous xylene comprising:

exposing the gaseous xylene to ultraviolet light to oxidize the gaseous xylene into gaseous oxidation products; and reacting the gaseous oxidation products with an internal surface of a chamber, the internal surface comprising a dry porous cementitious and chemically sorbent material which is chemically reactive with the gaseous oxidation products, the gaseous oxidation products being reacted with the dry porous cementitious material to produce solid reaction products incorporated in sidewalls of the chamber.

71. A method of photochemically oxidizing a gaseous benzidine comprising:

exposing the gaseous benzidine to ultraviolet light to oxidize the gaseous benzidine into gaseous oxidation products; and reacting the gaseous oxidation products with an internal surface of a chamber, the internal surface comprising a dry porous cementitious and chemically sorbent material which is chemically reactive with the gaseous oxidation products, the gaseous oxidation products being reacted with the dry porous cementitious material to produce solid reaction products incorporated in sidewalls of the chamber.

72. A method of photochemically oxidizing a gaseous phenol comprising:

exposing the gaseous phenol to ultraviolet light to oxidize the gaseous phenol into gaseous oxidation products; and reacting the gaseous oxidation products with an internal surface of a chamber, the internal surface comprising a dry porous cementitious and chemically sorbent material which is chemically reactive with the gaseous oxidation products, the gaseous oxidation products being reacted with the dry porous cementitious material to produce solid reaction products incorporated in sidewalls of the chamber.

73. A method of photochemically oxidizing a gaseous hydrazine comprising:

exposing the gaseous hydrazine to ultraviolet light to oxidize the gaseous hydrazine into gaseous oxidation products; and reacting the gaseous oxidation products with an internal surface of a chamber, the internal surface comprising a dry porous cementitious and chemically sorbent material which is chemically reactive with the gaseous oxidation products, the gaseous oxidation products being reacted with the dry porous cementitious material to produce solid reaction products incorporated in sidewalls of the chamber.

74. A method of photochemically oxidizing a gaseous butanone comprising:

exposing the gaseous butanone to ultraviolet light to oxidize the gaseous butanone into gaseous oxidation products; and reacting the gaseous oxidation products with an internal surface of a chamber, the internal surface comprising a dry porous cementitious and chemically sorbent material which is chemically reactive with the gaseous oxidation products, the gaseous oxidation products being reacted with the dry porous cementitious material to produce solid reaction products incorporated in sidewalls of the chamber.

75. A method of photochemically oxidizing a gaseous hexane comprising:

exposing the gaseous hexane to ultraviolet light to oxidize the gaseous hexane into gaseous oxidation products; and reacting the gaseous oxidation products with an internal surface of a chamber, the internal surface comprising a dry porous cementitious and chemically sorbent material which is chemically reactive with the gaseous oxidation products, the gaseous oxidation products being reacted with the dry porous cementitious material to produce solid reaction products incorporated in sidewalls of the chamber.

76. A method of photochemically oxidizing a gaseous anthrene comprising:

exposing the gaseous anthrene to ultraviolet light to oxidize the gaseous anthrene into gaseous oxidation products; and reacting the gaseous oxidation products with an internal surface of a chamber, the internal surface comprising a dry porous cementitious and chemically sorbent material which is chemically reactive with the gaseous oxidation products, the gaseous oxidation products being reacted with the dry porous cementitious material to produce solid reaction products incorporated in sidewalls of the chamber.

77. A method of photochemically oxidizing a gaseous amine comprising:

exposing the gaseous amine to ultraviolet light to oxidize the gaseous amine into gaseous oxidation products; and reacting the gaseous oxidation products with an internal surface of a chamber, the internal surface comprising a dry porous cementitious and chemically sorbent material which is chemically reactive with the gaseous oxidation products, the gaseous oxidation products being reacted with the dry porous cementitious material to produce solid reaction products incorporated in sidewalls of the chamber.

* * * * *